(12) United States Patent
Snopek et al.

(10) Patent No.: US 11,861,720 B1
(45) Date of Patent: Jan. 2, 2024

(54) SYSTEMS AND METHODS FOR AUTOMATIC RECORDING OF INSURANCE CARD INFORMATION

(71) Applicant: WALGREEN CO., Deerfield, IL (US)

(72) Inventors: Adam Robert Snopek, Chicago, IL (US); Renata Lurye, Glenview, IL (US); Oliver Derza, Willowbrook, IL (US)

(73) Assignee: WALGREEN CO., Deerfield, IL (US)

( * ) Notice: Subject to any disclaimer, the term of this patent is extended or adjusted under 35 U.S.C. 154(b) by 790 days.

(21) Appl. No.: 16/531,872

(22) Filed: Aug. 5, 2019

(51) Int. Cl.
*G06Q 40/00* (2023.01)
*G06Q 40/08* (2012.01)
*G06Q 30/01* (2023.01)
*G06V 30/414* (2022.01)

(52) U.S. Cl.
CPC ............. *G06Q 40/08* (2013.01); *G06Q 30/01* (2013.01); *G06V 30/414* (2022.01)

(58) Field of Classification Search
CPC ....... G06Q 40/08; G06Q 30/08; G06V 30/414
USPC ................................................ 705/4, 35–45
See application file for complete search history.

(56) References Cited

U.S. PATENT DOCUMENTS

| | | | | |
|---|---|---|---|---|
| 11,043,293 | B1* | 6/2021 | Salzbrenner | G06Q 40/08 |
| 2015/0032480 | A1* | 1/2015 | Blackhurst | G06Q 40/08 |
| | | | | 705/4 |
| 2019/0080416 | A1* | 3/2019 | Smith | G06Q 40/08 |
| 2019/0267123 | A1* | 8/2019 | Stueckemann | G06Q 40/08 |

FOREIGN PATENT DOCUMENTS

JP  11250140 A  *  9/1999  ............. G06Q 40/08

\* cited by examiner

*Primary Examiner* — Jessica Lemieux
*Assistant Examiner* — Mohammed H Mustafa
(74) *Attorney, Agent, or Firm* — MARSHALL, GERSTEIN & BORUN LLP; Randall G. Rueth

(57) ABSTRACT

To extract information from a customer's insurance card, an insurance policy recordation system obtains a scanned image of an insurance card and analyzes text in the insurance card image to identify labels describing insurance policy characteristics and insurance policy values corresponding to the insurance policy characteristics. The insurance policy recordation system compares the identified insurance policy values to a set of stored identifiers associated with various insurance plans. If the insurance policy values match one or more of the identifiers, the insurance policy recordation system may determine that the insurance policy values are valid and that the customer has the matching insurance plan. The insurance policy recordation system may obtain additional insurance policy information for the customer based on the stored information in association with the matching insurance plan. Then the insurance policy recordation system may update the customer's record with the insurance policy values and/or additional insurance policy information.

14 Claims, 11 Drawing Sheets

| Contract Name | Input Code | Plan Name | Plan Effective Date | BIN | PCN |
|---|---|---|---|---|---|
| Prime Therapeutics | ALBC | Blue Cross Blue Shield Of Alabama | 2/1/00 | 004915 | |
| Prime Therapeutics | ALBCWRI | Prime Therapeutics ALBC Work Related Injury WRI | 7/1/00 | 004915 | WRI |
| Prime Therapeutics | AMERIHAD | AmeriHealth Administrators BlueLink | 10/1/18 | 610455 | AHA |
| Prime Therapeutics | BCBSKS | Blue Cross Blue Shield Of Kansas | 1/1/15 | 610455 | BCBSKS |

*FIG. 6*

| User ID 702 | Name 704 | Contract Name 706 | Input Code 708 | Plan Name 710 | BIN 712 | PCN 714 | Member ID 716 | Group No. 718 |
|---|---|---|---|---|---|---|---|---|
| 1 | John Doe | Caremark | APM | Advance PCS Advance RX | 004336 | ADV | 001XXXX100 | 2999932 |
| 2 | Jane Smith | | | | | | | |
| 3 | Bob Johnson | | | | | | | |
| 4 | Mary Jones | | | | | | | |

SYSTEMS AND METHODS FOR AUTOMATIC RECORDING OF INSURANCE CARD INFORMATION

TECHNICAL FIELD

The present disclosure generally relates to automatically recording insurance information and, more particularly to a method and system for scanning an image of an insurance card to automatically extract insurance policy information from the insurance card.

BACKGROUND

Typically, a patient (or customer) requesting healthcare services, such as ordering a prescription medication or requesting a refill for a prescription medication is asked to provide health insurance information. The customer provides her health insurance card to the healthcare provider to enter in the insurance policy information included on the insurance card.

However, healthcare providers may be required to enter insurance policy information for millions of policies per year. This can be time consuming and costly for the healthcare providers. Each insurance card may be in a different format adding to the time and cost associated with identifying insurance policy information for each customer from their respective insurance cards. Additionally, this manual process may be error prone as manual entry may lead to inaccuracies.

SUMMARY

To automatically record insurance policy information for a customer, an insurance policy recordation system receives a scanned image of the customer's insurance card, for example from the customer's client device. The insurance card provides information related to the customer's insurance plan, such as a health insurance plan. The insurance policy recordation system then analyzes the image of the insurance card to identify regions of text presented on the insurance card. The insurance policy recordation system compares the text in each region to a set of insurance policy characteristics (e.g., a policyholder name, a policyholder identifier, a policyholder group number, a contract name, an insurance plan name, an input code corresponding to the insurance plan name, an insurance plan effective date, a bank identification number (BIN), a primary care network (PCN), etc.) to determine whether the text in a particular region is a label describing one of the insurance policy characteristics. If the insurance policy recordation system identifies the text or a portion of the text in a region as a label describing one of the insurance policy characteristics, the insurance policy recordation system may identify the insurance policy value for the insurance policy characteristic as the remaining text in the region. For example, if the insurance policy recordation system identifies a delimiter to the right of the label, such as a colon, hyphen, comma, parentheses, quotation marks, etc., the insurance policy recordation system may determine that the remaining text in the region after the delimiter is the insurance policy value corresponding to the label. On the other hand, if there is no remaining text in the region after the label, the insurance policy recordation system may identify text within a second region as the insurance policy value corresponding to the label, where the second region is identified based on proximity to the first region that includes the label. More specifically, the insurance policy recordation system may determine distances from the region that includes the label to the other regions in the insurance card, and may identify the region with the shortest distance in the width-direction of the insurance card (also referred to therein as the "x-direction"), the region with the shortest distance in the length-direction of the insurance card (also referred to herein as the "y-direction"), or the region with the shortest distance in any suitable combination of the x- and y-directions.

In any event, the insurance policy recordation system may compare some of the identified insurance policy values to insurance policy values in a list of insurance plans. For example, the insurance policy recordation system may compare the BIN value and the PCN value obtained from the insurance card to a list of BIN and PCN values for different insurance plans. If the BIN value and/or the PCN value match with the BIN value and/or the PCN value for a particular insurance plan, the insurance policy recordation system may determine that the customer has the particular insurance plan. Accordingly, the insurance policy recordation system may identify additional insurance policy values associated with the particular insurance plan which may not be included on the insurance card, but are stored in association with the particular insurance plan. The insurance policy recordation system may then determine that the insurance policy values retrieved from the insurance card are accurate and may update the customer record or user profile for the customer with the identified insurance policy values. Accordingly, the insurance policy recordation system may provide the insurance policy values to a database to be stored with the customer record or user profile for the customer.

If on the other hand, the identified insurance policy values from the insurance card do not match with insurance policy values for one of the insurance plans, the insurance policy recordation system may perform natural language processing to identify text in regions as labels describing insurance policy characteristics, and may identify insurance policy values for the insurance policy characteristics as the remaining text in the regions. Furthermore, the insurance policy recordation system may apply a stored set of rules for translating insurance policy values to valid insurance policy values, and may translate a particular insurance policy value using the stored set of rules.

In this manner, the insurance policy recordation system automatically generates accurate insurance policy information from a customer's insurance card. Furthermore, the insurance policy recordation system converts non-standardized insurance cards into a standardized format including the same set of insurance policy characteristics and corresponding values for each customer.

In one embodiment, a method of extracting information from an insurance card includes storing, for each of a plurality of customers, a customer record including a customer identifier indicative of the customer, and storing, for each of a plurality of insurance plans, one or more identifiers associated with the insurance plan. The method further includes receiving, at the one or more processors, from a client device, over a network, a customer identifier for one of the plurality of customers and an image of an insurance card for the customer, where the insurance card is associated with an insurance plan and the image of the insurance card is captured by a camera in the client device. Moreover, the method includes analyzing, by the one or more processors, the image of the insurance card to identify an insurance policy value for each of a plurality of insurance policy characteristics associated with the insurance plan, comparing, by the one or more processors, one or more of the identified insurance policy values to the one or more identifiers associated with each of the plurality of insurance plans, and in response to identifying a match between the one or more identified insurance policy values and the one or more identifiers associated with one of the plurality of insurance plans, providing, by the one or more processors, the identified insurance policy values to be stored in the customer record of the customer. Furthermore, the method includes updating the customer record for the customer with the identified insurance policy values.

In another embodiment, a system for extracting information from an insurance card is provided. The system includes a communication network, and a server device communicatively coupled to the communication network. The server device includes one or more processors, and a non-transitory computer-readable memory coupled to the one or more processors, and the communication network and storing instructions thereon. When executed by the one or more processors, the instructions cause the server to store for each of a plurality of customers, a customer record including a customer identifier indicative of a customer, store for each of a plurality of insurance plans, one or more identifiers associated with the insurance plan, and receive from a client device communicatively coupled to the communication network, a customer identifier for one of the plurality of customers and an image of an insurance card for the customer, where the insurance card is associated with an insurance plan and the image of the insurance card is captured by a camera in the client device. The instructions further cause the server device to analyze the image of the insurance card to identify an insurance policy value for each of a plurality of insurance policy characteristics associated with the insurance plan, and compare one or more of the identified insurance policy values to the one or more identifiers associated with each of the plurality of insurance plans. In response to identifying a match between the one or more identified insurance policy values and the one or more identifiers associated with one of the plurality of insurance plans, the instructions cause the server device to provide the identified insurance policy values to be stored in the customer record of the customer, and update the customer record for the customer with the identified insurance policy values.

BRIEF DESCRIPTION OF THE DRAWINGS

The figures described below depict various aspects of the system and methods disclosed therein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

FIG. 6 depicts an example data table including identifiers for different insurance plans;

FIG. 7 depicts an example data table including customer records updated to include insurance policy information.

DETAILED DESCRIPTION

Figure 1A:
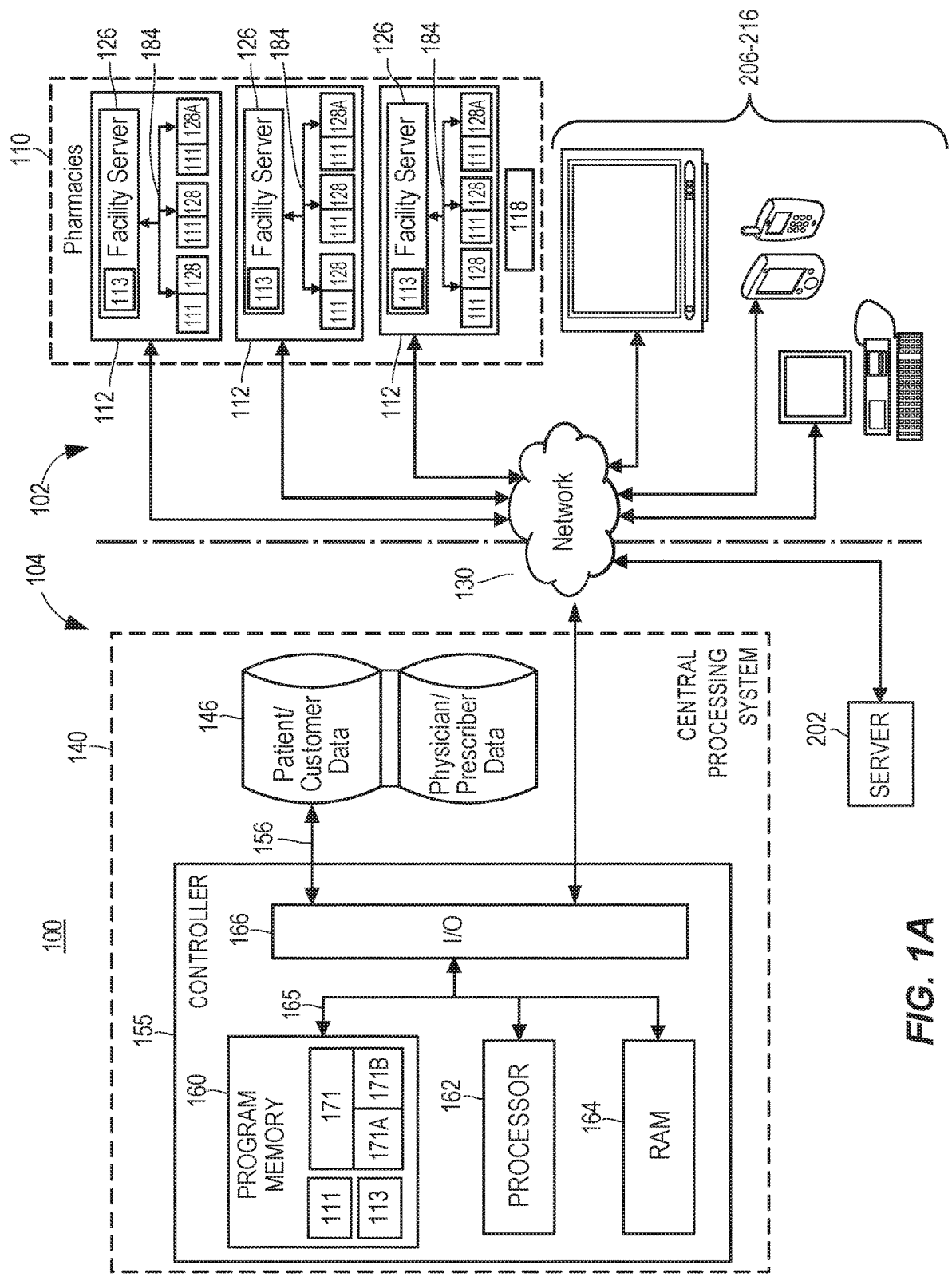
FIG. 1A illustrates a block diagram of a computer network and system on which an exemplary insurance policy recordation system and method may operate in accordance with the described embodiments.

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

A "healthcare provider," as used herein, may provide health care diagnostic, therapeutic, rehabilitation, and other services to patients. For example, the healthcare provider may provide physician care, therapy, imaging, counseling, or the like. The healthcare provider may provide inpatient and/or outpatient services, and may include one or more physical locations or facilities. Healthcare providers may include pharmacy entities or enterprises that fill or provide prescription products and services, hospitals, healthcare data repositories, managed care organizations, physicians and/or physician groups, and other medical professionals that are licensed to prescribe medical products and medicaments to patients. Healthcare providers may also include a hospital group, a medical practice group, a stand-alone imaging facility, a home-health service provider, and others. Additionally or alternatively, the healthcare provider may provide other healthcare related services, such as providing billing management, providing healthcare insurance, maintaining electronic medical records, etc.

As used herein, the term "customer" indicates someone purchasing a retail product but may additionally be, by way of example, a patient (i.e., the person named on the prescription), a guardian (e.g., the parent of a child named on the prescription), a care-giver (i.e., anyone who takes care of a patient or picks up the medication on the patient's behalf), etc. Moreover, the term "customer" is not limited to a single person, but may instead be any person or persons having a reason or desire to purchase one or more retail products or to perform one or more functions relating to prescription medications, whether the prescriptions are related to a single patient or multiple patients. For example, a customer could be a caregiver responsible for patients with a specific disease that progresses in a known manner. The caregiver customer might greatly benefit from gaining information related to various medications and health products to assist in his or her caregiver responsibilities. In any event, while the term "customer" may be used interchangeably with the term "patient," in this specification the term "customer" is used primarily so as to avoid confusion.

Generally speaking, an insurance policy recordation system allows a customer to scan an insurance card, via a client device, and the system automatically retrieves insurance policy information associated with the insurance card. To scan an insurance card, the customer launches a client application such as an insurance scan application on the client device, logs into the system and subsequently navigates to an image capture screen within the client application. The client application then scans the insurance card using the image capture screen. In other implementations, the healthcare provider may scan the insurance card at a retail store (e.g., an in-store retail pharmacy), via a pharmacy workstation 128 or other in-store computing device such as a smart phone, tablet, scanner, etc. As a result, the insurance policy recordation system automatically retrieves insurance policy information and updates the customer's record or user profile with the insurance policy information. In this manner, a healthcare provider has the customer's insurance policy information on file for billing the insurer when the customer purchases healthcare related services or health-related retail products, such as prescription medications.

More specifically, the insurance policy recordation system automatically converts the information from the insurance card into a standardized health insurance record for the customer, which includes for example, the customer's name, member identifier (ID), group number, contract name, insurance provider, insurance plan name, input code corresponding to the insurance plan name, insurance plan effective date, BIN, and PCN.

FIG. 1A illustrates various aspects of an exemplary architecture implementing an insurance policy recordation system 100. In particular, FIG. 1A illustrates a block diagram of the insurance policy recordation system 100. The high-level architecture includes both hardware and software applications, as well as various data communications channels for communicating data between the various hardware and software components. The insurance policy recordation system 100 may be roughly divided into front-end components 102 and back-end components 104. The front-end components 102 are primarily disposed within a retail network 110 including one or more pharmacies 112. The pharmacies 112 may be located, by way of example rather than limitation, in separate geographic locations from each other, including different areas of the same city, different cities, or even different states. The front-end components 102 comprise a number of pharmacy workstations 128. The pharmacy workstations 128 are local computers located in the various pharmacies 112 throughout the retail network 110 and executing various pharmacy management-related applications. Pharmacists, technicians, and other pharmacy personnel, referred to collectively herein simply as "pharmacists" (not shown), use the pharmacy workstations 128 to access customer information, enter new paper prescriptions, access insurance and payment information and so forth. Each of the pharmacies 112 may be, for example, an in-store retail pharmacy, an on-line pharmacy, a mail-order pharmacy, a long-term care pharmacy, a workplace/on-site pharmacy, or a specialty pharmacy. The retail network 110 may also include one or more warehouses or central-filling facilities 118. The warehouses or central-filling facilities 118 may distribute medications or retail products to the various retail pharmacies 112 in the retail network 110, or may distribute medications or retail products directly to customers. Client computing devices 206-216 (also referred to herein as "client devices") (e.g., personal computers, cellular phones, smart phones, web-enabled televisions, etc.) may be communicatively connected to the pharmacies 112 and to a system 140 through a digital network 130, as described below.

Those of ordinary skill in the art will recognize that the front-end components 102 could also comprise a plurality of facility servers 126 disposed at the plurality of pharmacies 112 instead of, or in addition to, a plurality of pharmacy workstations 128. Each of the pharmacies 112 may include one or more facility servers 126 that may facilitate communications between the workstations 128 of the pharmacies 112 via a digital network 130, and may store information for a plurality of customers/employees/accounts/etc. associated with each facility. Of course, a local digital network 184 may also operatively connect each of the workstations 128 to the facility server 126. Unless otherwise indicated, any discussion of the workstations 128 also refers to the facility servers 126, and vice versa. Moreover, environments other than the pharmacies 112 may employ the workstations 128 and the servers 126. As used herein, the term "pharmacy" refers to any of these environments (e.g., call centers, kiosks, Internet interface terminals, etc.) in addition to the retail pharmacies 112, etc. described above.

The front-end components 102 communicate with the back-end components 104 via the digital network 130. One or more of the front-end components 102 may be excluded from communication with the back-end components 104 by configuration or by limiting access due to security concerns. For example, the client devices 206-216 may be excluded from direct access to the back-end components 104. In some embodiments, the pharmacies 112 may communicate with the back-end components via the digital network 130. In other embodiments, the pharmacies 112 and client devices 206-216 may communicate with the back-end components 104 via the same digital network 130, but digital access rights, IP masking, and other network configurations may deny access to the client devices 206-216.

The digital network 130 may be a proprietary network, a secure public Internet, a virtual private network or some other type of network, such as dedicated access lines, plain ordinary telephone lines, satellite links, combinations of these, etc. Where the digital network 130 comprises the Internet, data communication may take place over the digital network 130 via an Internet communication protocol. In addition to one or more servers 202 (described below), the back-end components 104 include the central processing system 140 within a central processing facility, such as, for example, the central processing facility described in U.S. Pat. No. 8,175,891 entitled "DISTRIBUTED PHARMACY PRESCRIPTION PROCESSING SYSTEM" the entire disclosure of which is incorporated by reference herein. Of course, the pharmacies 112 may be communicatively connected to different back-end components 104 having one or more functions or capabilities that are similar to the central processing system 140. The central processing system 140 may include one or more computer processors 162 adapted and configured to execute various software applications and components of the insurance policy recordation system 100, in addition to other software applications. The central processing system 140 further includes a database 146. The database 146 is adapted to store data related to the operation of the insurance policy recordation system 100 (e.g., user profile data including a customer identifier such as a username and/or password, a user ID, etc., a customer name, and insurance policy information such as a member ID, group number, contract name, insurance provider, insurance plan name, input code corresponding to the insurance plan name, insurance plan effective date, BIN, and PCN. The central processing system 140 may access data stored in the database 146 when executing various functions and tasks associated with the operation of the insurance policy recordation system 100.

Although FIG. 1A depicts the insurance policy recordation system 100 as including the central processing system 140 in communication with three pharmacies 112, and various client devices 206-216 it should be understood that different numbers of processing systems, pharmacies, and devices may be utilized. For example, the digital network 130 (or other digital networks, not shown) may interconnect the central processing system 140 to a plurality of included central processing systems 140, hundreds of pharmacies 112, and thousands of client devices 206-216. According to the disclosed example, this configuration may provide several advantages, such as, for example, enabling near real-time uploads and downloads of information as well as periodic uploads and downloads of information. This provides for a primary backup of all the information generated in the insurance recordation process. Alternatively, some of the pharmacies 112 may store data locally on the facility server 126 and/or the workstations 128.

FIG. 1A also depicts one possible embodiment of the central processing system 140. The central processing system 140 may have a controller 155 operatively connected to the database 146 via a link 156 connected to an input/output (I/O) circuit 166. It should be noted that, while not shown, additional databases may be linked to the controller 155 in a known manner.

The controller 155 includes a program memory 160, the processor 162 (may be called a microcontroller or a microprocessor), a random-access memory (RAM) 164, and the input/output (I/O) circuit 166, all of which are interconnected via an address/data bus 165. It should be appreciated that although only one microprocessor 162 is shown, the controller 155 may include multiple microprocessors 162. Similarly, the memory of the controller 155 may include multiple RAMs 164 and multiple program memories 160. Although the I/O circuit 166 is shown as a single block, it should be appreciated that the I/O circuit 166 may include a number of different types of I/O circuits. The RAM(s) 164 and the program memories 160 may be implemented as semiconductor memories, magnetically readable memories, and/or optically readable memories, for example. A link 135 may operatively connect the controller 155 to the digital network 130 through the I/O circuit 166.

The program memory 160 may also contain machine-readable instructions (i.e., software) 171, for execution by the processor 162. The software 171 may perform the various tasks associated with operation of the pharmacy or pharmacies, and may be a single module 171 or a plurality of modules 171A, 171B. While the software 171 is depicted in FIG. 1A as including two modules, 171A and 171B, the software 171 may include any number of modules accomplishing tasks related to pharmacy operation including, for example, receiving insurance policy information, billing insurers, etc. The central processing system 140 implements a server application 113 for providing data to a user interface application 111 operating on the workstations 128.

Figure 1B:
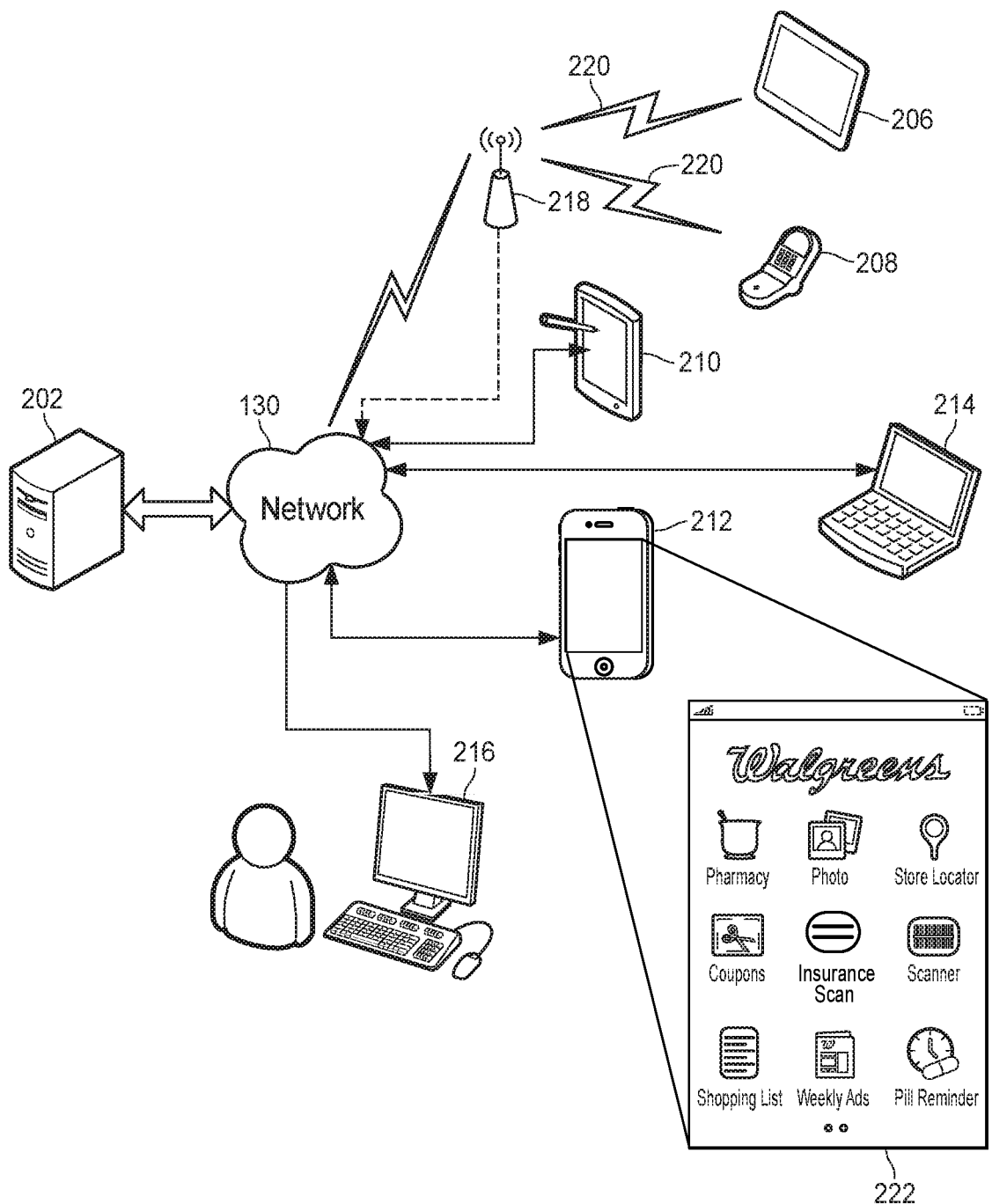
FIG. 1B illustrates client devices and associated equipment that may operate with a network and a server.

For purposes of implementing the insurance policy recordation system 100, the user interacts with the server 202 and the pharmacy systems (e.g., the central processing system 140) via a client device 206-216 (e.g., mobile device application, etc.), a specialized application, or a plurality of web pages. FIG. 1B depicts the server 202 connected via the network 130 to the client devices 206-216 through which a user may initiate and interact with the insurance policy recordation system 100 (as shown in FIG. 1A). The client devices 206-216 may include, by way of example, a tablet computer 206, a web-enabled cell phone 208, a personal digital assistant (PDA) 210, a mobile device smart-phone 212 also referred to herein as a "mobile device," a laptop computer 214, a desktop computer 216, a portable media player (not shown), a wearable computing device such as Google Glass™ (not shown), etc. Of course, any client device appropriately configured may interact with the insurance policy recordation system 100. The client devices 206-216 need not necessarily communicate with the network 130 via a wired connection. In some instances, the client devices 206-216 may communicate with the network 130 via wireless signals 220 and, in some instances, may communicate with the network 130 via an intervening wireless or wired device 218, which may be a wireless router, a wireless repeater, a base transceiver station of a mobile telephony provider, etc. Each of the client devices 206-216 may interact with the server 202 to receive web pages, application views or server data from the server 202 and may display the web pages, application views or server data via a client application (described below). For example, the mobile device 212 may display a home screen 222 (i.e., the root or start page at which users enter the client application) of the client application to a user, may receive an input from the user, and may interact with the server 202 depending on the type of user-specified input. It will be appreciated that although only one server 202 is depicted in FIG. 1B, multiple servers 202 may be provided for the purpose of distributing server load, serving different web pages, implementing different portions of the pharmacy web interface, etc. These multiple servers 202 may include a web server, an entity-specific server (e.g. an Apple® server, etc.), a server that is disposed in a retail or proprietary network, an independent third-party server that is not under the control of the entity, etc.

Figure 1C:
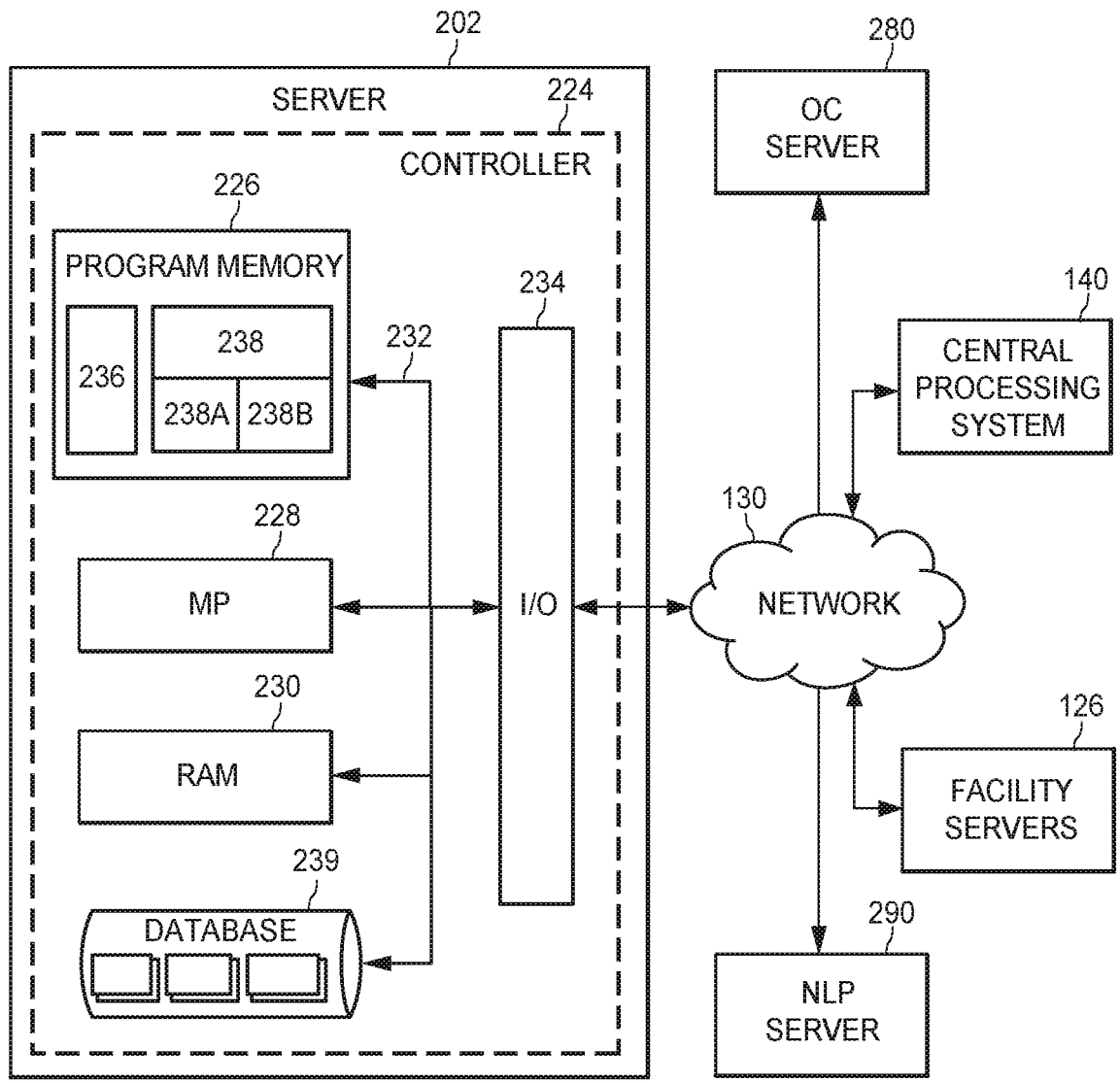
FIG. 1C illustrates a block diagram of an exemplary server.

Turning now to FIG. 1C, the server 202, like the facility server 126, includes a controller 224. Similar to the controllers 155 and 170, the controller 224 includes a program memory 226, a microcontroller or a microprocessor (MP) 228, a random-access memory (RAM) 230, and an input/output (I/O) circuit 234, all of which are interconnected via an address/data bus 232. In some embodiments, the controller 224 may also include, or otherwise be communicatively connected to, a database 239 or other data storage mechanism (e.g., one or more hard disk drives, optical storage drives, solid state storage devices, etc.). The database 239 may include data such as customer web profiles, product data, mobile device application data, web page templates and/or web pages, and other data necessary to interact with the user through the network 130. As discussed with reference to the controllers 155 and 170, it should be appreciated that although FIG. 1C depicts only one microprocessor 228, the controller 224 may include multiple microprocessors 228. Similarly, the memory of the controller 224 may include multiple RAMs 230 and multiple program memories 226. Although the FIG. 1C depicts the I/O circuit 234 as a single block, the I/O circuit 234 may include a number of different types of I/O circuits. The controller 224 may implement the RAM(s) 230 and the program memories 226 as semiconductor memories, magnetically readable memories, and/or optically readable memories, for example.

In addition to being connected through the network 130 to the client devices 206-216, as depicted in FIG. 11B, FIG. 1C illustrates that the server 202 may also be connected through the network 130 to the central processing system 140, one or more facility servers 126, an optical character recognition (OCR) server 280, and/or a natural language processing (NLP) server 290. As described below, the connection of the server 202 to the central processing system 140 assists in facilitating some of the functionality of the insurance recordation process. As a result, the server 202 may act as a routing or interfacing server between the plurality of client devices 206-216 and a destination server, namely, the central processing system 140. For example, the server 202 may be configured to communicate the central processing system 140 and with the client device 206-216 via a multitude of protocols, such as packet-switched protocols, web services, web APIs, etc. The server 202 may also convert (if necessary) and route client application data (not shown) to the appropriate server, such as the central process system 140 for example. Additionally, the server 202 may act as the destination server and need not route any data from the client device 206-216.

Furthermore, the server 202 may be configured to communicate with the OCR server 280 to provide an image of an insurance card to the OCR server 280 and receive strings of text and indications of regions within the image that include the text. This may include bounding boxes describing the pixel positions or image coordinates of the start and end points of a region in the image that contains a text string, and/or a width and height of the bounding box. More specifically, the OCR server 280 may analyze an image of an insurance card and provide to the server 202 an indication of a bounding box including pixel coordinates (10, 20), (10, 50), (40, 20) and (40, 50) and the text string "RxBIN" which is included in the bounding box. In other embodiments, the indication of the bounding box may include an x-coordinate of the starting point of the bounding box, a y-coordinate of the starting point of the bounding box, the width of the bounding box, and the height of the bounding box. The OCR server 280 may also provide indications of additional bounding boxes and corresponding text strings identified within the image of the insurance card. In some embodiments, the OCR server 280 is not a separate server from the server 202, and instead, the server 202 includes the functionality of the OCR server 280. As a result, the server 202 analyzes the image of the insurance card to identify bounding boxes and strings of text within each bounding box.

Additionally, the server 202 may be configured to communicate with the NLP server 290 to provide a text string to the NLP server 290 and receive an indication of an insurance policy characteristic that corresponds to the text string or a portion thereof. In some embodiments, the NLP server 290 may provide an indication of a likelihood or probability that the text string or a portion thereof corresponds to a particular insurance policy characteristic. More specifically, the NLP server 290 may store a predetermined list of candidate insurance policy characteristics, such as member ID, group number, contract name, insurance provider, insurance plan name, input code, insurance plan effective date, BIN, and PCN. For each candidate insurance policy characteristic, the NLP server 290 may store a list of terms, abbreviations, synonyms, nicknames, etc., that may be used to describe the insurance policy characteristic, for example in a label. The NLP server 290 may then compare the text string or portions of the text string to the list of terms, abbreviations, synonyms, nicknames, etc., that may be used to describe a particular insurance policy characteristic and may assign a likelihood or probability that the text string or a portion of the text string corresponds to the particular insurance policy characteristic based on how closely the text string or portion of the text string matches the terms, abbreviations, synonyms, nicknames, etc., associated with the particular insurance policy characteristic. The NLP server 290 may assign a likelihood or probability for each candidate insurance policy characteristic and may select the candidate insurance policy characteristic having the highest likelihood or probability as the insurance policy characteristic. The NLP server 290 may also repeat this process for various portions of the text string and may select the portion of the text string having the highest likelihood or probability. Then the NLP server 290 may provide the identified portion of the text string, the identified insurance policy characteristic, and an indication of the likelihood or probability that the identified portion of the text string corresponds to the identified insurance policy characteristic to the server 202. When the candidate insurance policy characteristic having the highest likelihood or probability is less than a threshold likelihood or probability (e.g., less than 50%), the NLP server 290 may indicate that no match was identified for the text string or any portion thereof. In some embodiments, the NLP server 290 is not a separate server from the server 202, and instead, the server 202 includes the functionality of the NLP server 290. As a result, the server 202 analyzes text strings or portions thereof to identify corresponding insurance policy characteristics.

As shown in FIG. 1C, the program memory 226 and/or the RAM 230 may store various applications for execution by the microprocessor 228. For example, a user-interface application 236 may provide a user interface to the server 202, which user interface may, for example, allow a network administrator to configure, troubleshoot, or test various aspects of the server's operation, or otherwise to access information thereon. A server application 238 operates to populate and transmit client application data and web pages to the client devices 206-216, receive information from the user transmitted back to the server 202, and forward appropriate data to the central processing system 140 and the facility servers 126, as described below. Like the software 171 of FIGS. 1A and 1B, the server application 238 may be a single module 238 or a plurality of modules 238A, 238B.

While the server application 238 is depicted in FIG. 1C as including two modules, 238A and 238B, the server application 238 may include any number of modules accomplishing tasks related to implementation of the server 202. By way of example, the module 238A may receive images of insurance cards, module 238B may be an OCR module for analyzing an image of an insurance card and identifying regions of the image having text, module 238C (not shown) may be an NLP module for performing natural language processing on the regions of text to identify an insurance policy characteristic that corresponds to a text string or a portion thereof, module 238D (not shown) may be a proximity module for identifying a text region that includes an insurance policy value which corresponds to another text region that includes an insurance policy characteristic, module 238E (not shown) may be a comparison module for comparing at least some of the insurance policy values identified for some of the insurance policy characteristics to identifiers or insurance policy values associated with insurance plans, and module 238F (not shown) may provide the insurance policy values to a database for storage to update the customer's record or user profile.

Figure 1D:
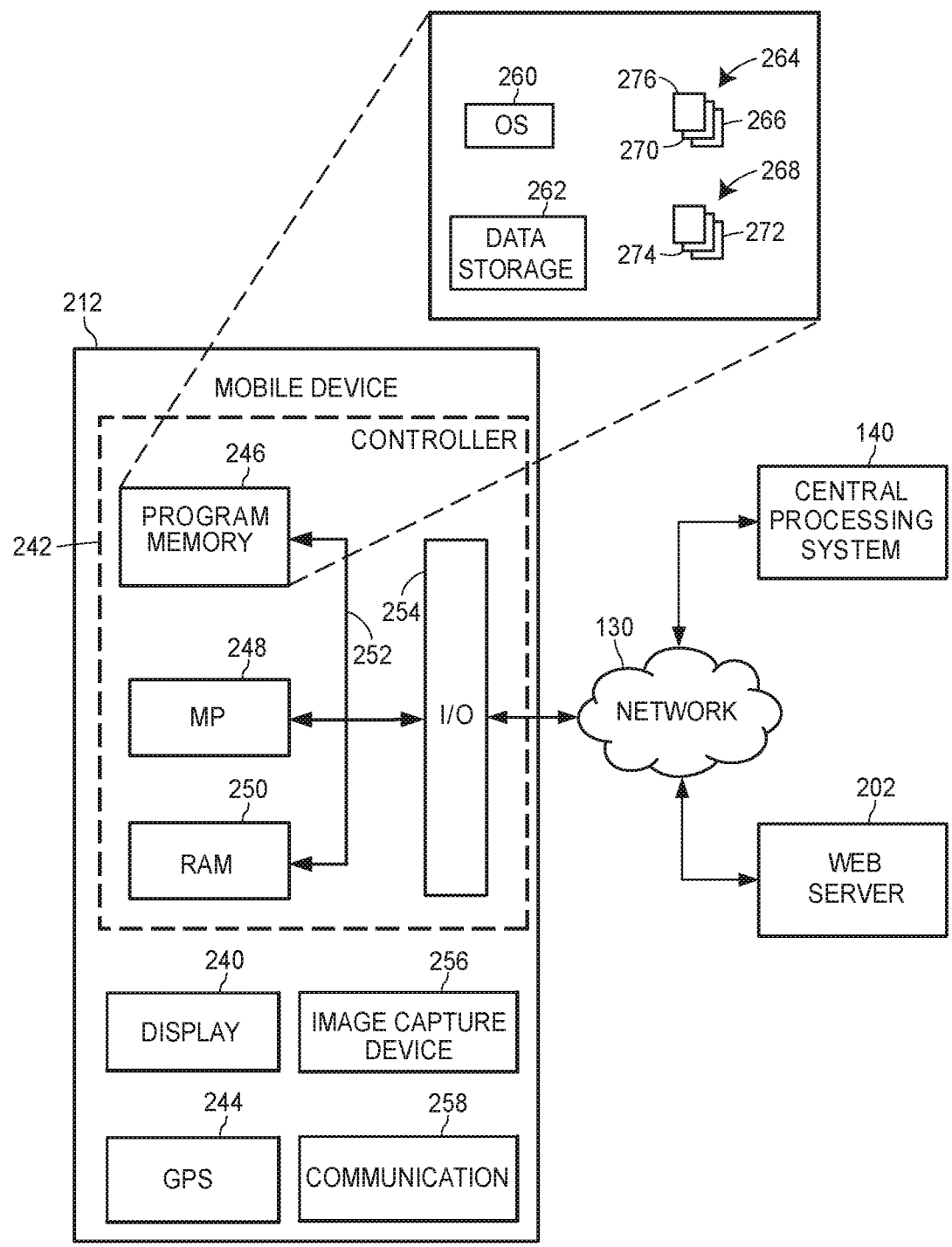
FIG. 1D illustrates a block diagram of an exemplary mobile device.

Referring now to FIG. 1D, the mobile device 212 (or any of the client devices 206-216) includes a display 240, a Global Positioning System (GPS) unit 244, a communication unit 258, an image capture device 256, a user-input device (not shown), and, like the server 202, a controller 242. Similar to the controllers 155 and 224, the controller 242 includes a program memory 246, one or more microcontroller or a microprocessor (MP) 248, a random-access memory (RAM) 250, and an input/output (I/O) circuit 254, all of which are interconnected via an address/data bus 252. The program memory 246 includes an operating system 260, a data storage 262, a plurality of software applications 264, and a plurality of software routines 268. The operating system 260, for example, may include one of a plurality of mobile platforms such as the iOS®, Android™, Palm® webOS, Windows Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively. The data storage 262 may include data such as user profiles or customer records, application data for the plurality of applications 264, routine data for the plurality of routines 268, and other data necessary to interact with the server 202, the facility servers 126, or the server applications 113 through the digital network 130. In some embodiments, the controller 242 may also include, or otherwise be communicatively connected to, other data storage mechanisms (e.g., one or more hard disk drives, optical storage drives, solid state storage devices, etc.) that reside within the mobile device 212.

The GPS unit 244 may use "Assisted GPS" (A-GPS), satellite GPS, or any other suitable global positioning protocol or system that locates the position the mobile device 212. For example, A-GPS utilizes terrestrial cell phone towers or wi-fi hotspots (e.g., wireless router points) to more accurately and more quickly determine location of the mobile device 212 while satellite GPS generally are more useful in more remote regions that lack cell towers or wifi hotspots. The communication unit 258 may communicate with the server 202 via any suitable wireless communication protocol network, such as a wireless telephony network (e.g., GSM, CDMA, LTE, etc.), a wi-fi network (802.11 standards), a WiMAX network, a Bluetooth network, etc. The image capture device 256 may be a built-in camera within the mobile device 212 or may be an external camera, such as a webcam, that is communicatively coupled with the mobile device 212 (or any other client device 206-216). The user-input device (not shown) may include a "soft" keyboard that is displayed on the display 240 of the mobile device 212, an external hardware keyboard communicating via a wired or a wireless connection (e.g., a Bluetooth keyboard), an external mouse, or any other suitable user-input device. As discussed with reference to the controllers 155 and 224, it should be appreciated that although FIG. 1D depicts only one microprocessor 248, the controller 242 may include multiple microprocessors 248. Similarly, the memory of the controller 242 may include multiple RAMs 250 and multiple program memories 246. Although the FIG. 1D depicts the I/O circuit 254 as a single block, the I/O circuit 254 may include a number of different types of I/O circuits. The controller 242 may implement the RAM(s) 250 and the program memories 246 as semiconductor memories, magnetically readable memories, and/or optically readable memories, for example.

The one or more processors 248 may be adapted and configured to execute any one or more of the plurality of software applications 264 and/or any one or more of the plurality of software routines 268 residing in the program memory 242, in addition to other software applications. One of the plurality of applications 264 may be a client application 266 that may be implemented as a series of machine-readable instructions for performing the various tasks associated with receiving information at, displaying information on, and transmitting information from the mobile device 212. One of the plurality of applications 264 may be a native application or web browser 270, such as Apple's Safari®, Google Android™ mobile web browser, Microsoft Internet Explorer® for Mobile, Opera Mobile™, that may be implemented as a series of machine-readable instructions for receiving, interpreting, and displaying web page information or application data from the server 202, the facility servers 126, or the server applications 113 while also receiving inputs from the user. Another application of the plurality of applications may include an embedded web browser 276 that may be implemented as a series of machine-readable instructions for receiving, interpreting, and displaying web page information from the servers 202, 126, or server applications 113 within the client application 266. One of the plurality of routines may include an image capture routine 272 that coordinates with the image capture device 256 to retrieve image data for use with one or more of the plurality of applications, such as the client application 266, or for use with other routines. Another routine in the plurality of routines may include an insurance card scanning routine 274 that provides the retrieved image data to the server 202.

Preferably, a customer, a patient, or a user (such as a healthcare provider) may launch the client application 266 from a client device, such as one of the client devices 206-216, to access the server 202 cooperating with the central processing system 140 and the pharmacies 110 to implement the insurance policy recordation system 100. Additionally, the customer, the patient, or the user may also launch or instantiate any other suitable user interface application (e.g., the native application or web browser 270, or any other one of the plurality of software applications 264) to access the server 202, the facility servers 126, or the server applications 113 to realize the insurance policy recordation system 100. Generally, the term "user" is used when referring to a person who is operating one of the client devices 206-216 and is not exclusive of the terms "customer" and "patient."

As described above, the database 146, illustrated in FIG. 1A, includes various information about the pharmacy's customers, prescribing physicians, the prescriptions filled by the pharmacy and prescription medications. Customer records are among the exemplary data that the insurance policy recordation system 100 may store in the database 146. A customer record contains important information about the customer and the various pharmacy services that have been invoked by, or on behalf of, the customer in a user profile. The user profile includes basic biographical information about the customer, such as a customer name, a customer address, a customer phone number, a customer birth date, customer prescription history, a list of authorized patients the customer can fill prescriptions on behalf of, a default pickup store for the customer, a default pickup time and date, etc. The user profile may also include customer insurance information, such as the customer's member ID, group number, contract name, insurance provider, insurance plan name, input code corresponding to the insurance plan name, insurance plan effective date, BIN, and PCN, etc. When the pharmacy or other healthcare provider has not received the customer's insurance information this portion of the user profile may not be populated.

As shown in FIG. 1B, to access the server 202, the facility servers 126, or the server applications 113, the user executes the client application 266 on one of the client devices 206-216, such as the mobile device 212. Using the client application 266, the user may request server data (not shown) by navigating a series of client application screens, such as the home screen 222 of the client application 266. FIGS. 2, 3 and 4A-4C depict client application pages or screens that the server 202, the facility servers 126, or the server applications 113 may transmit in various embodiments of the insurance policy recordation system 100. In any event, the user may launch the client application 266 from one of the client devices 206-216 via any suitable manner, such as touch-selecting a client application icon (not shown) on the display 240 of the mobile device 212, double-clicking on the client application icon via a mouse of a computer 216 or a trackpad (not shown) of a laptop 214. After the user launches the client application 266, the home screen 222 of the client application 266 is displayed to the user on the mobile device 212.

Figure 2:
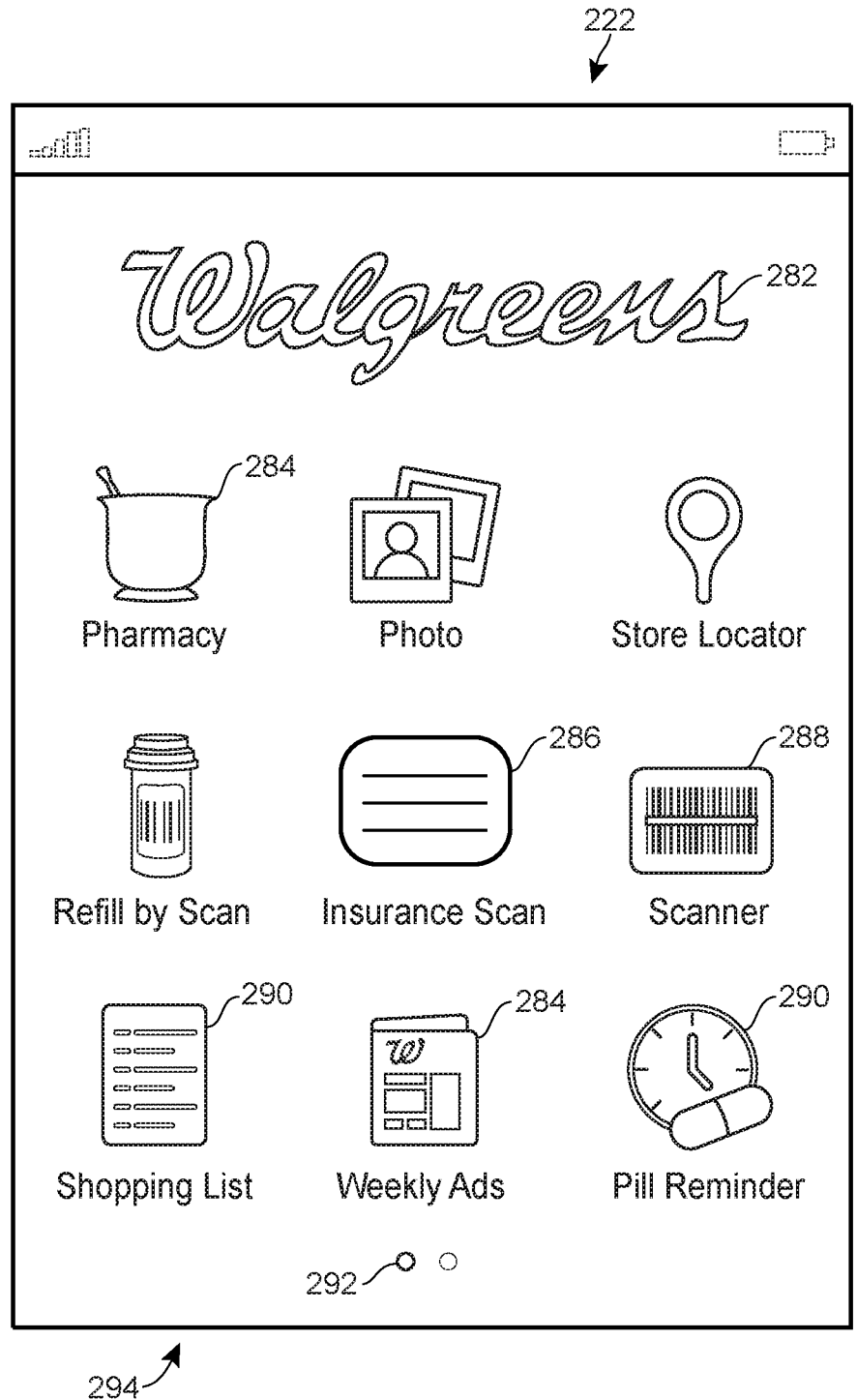
FIG. 2 depicts a home screen of a client application.

With reference now to FIG. 2, a first menu page 294 of the home screen 222 of the client application 266, for example, is displayed to the user on the mobile device 212. The home screen 222 may include a company logo 282, a pharmacy services link 284, an insurance scan link 286, a scanner link 288, a pill reminder link 290, and a menu page indicator 292. In FIG. 2, the menu page indicator 292 denotes that only the first menu page of the home screen 222 is currently being displayed. The user may touch-swipe on the display 240 of the mobile device 212 to view the second menu page (not shown) of the home screen 222. The second menu page of the home screen 222 may display additional links that cannot be accommodated on the first menu page of the home screen 222 (e.g., a shopping link, etc.). In another embodiment, using the client application 266, the user may request and navigate a series of web pages or application views transmitted, preferably in a secure manner (e.g., using Hypertext Transfer Protocol Secure, known as "HTTPS"), by the server 202 to the client device 206-216. These web pages or application views may be interpreted and displayed via the native application or web browser 270 of the mobile device 212 or via a web browser (not shown) of the computers 214, 216. It should be understood that it may be desirable for some or all of the data transmitted from the server 202 to the client device 206-216, or vice versa, to be encrypted and/or otherwise transmitted in a secure manner.

Figure 3:
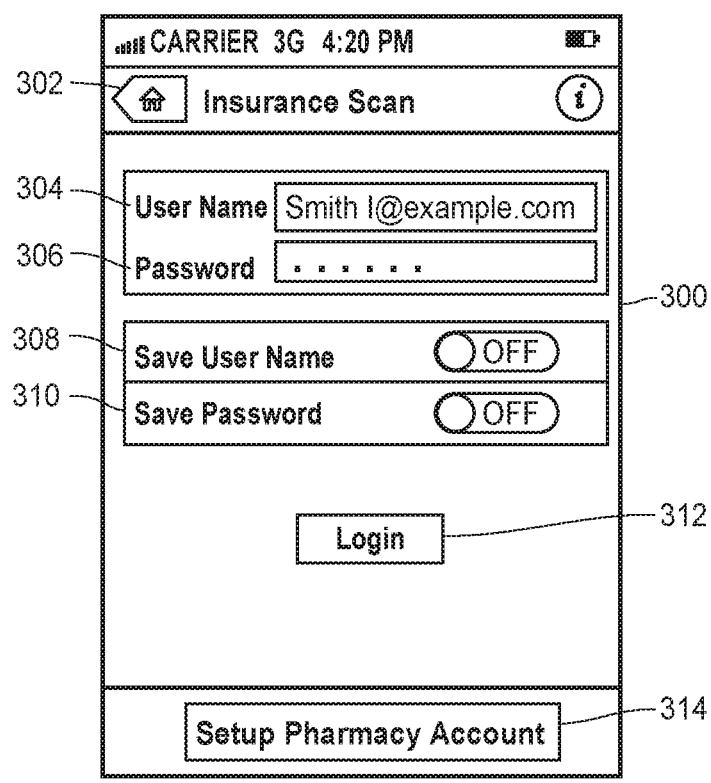
FIG. 3 depicts a login screen of a client application.
Figure 4A:
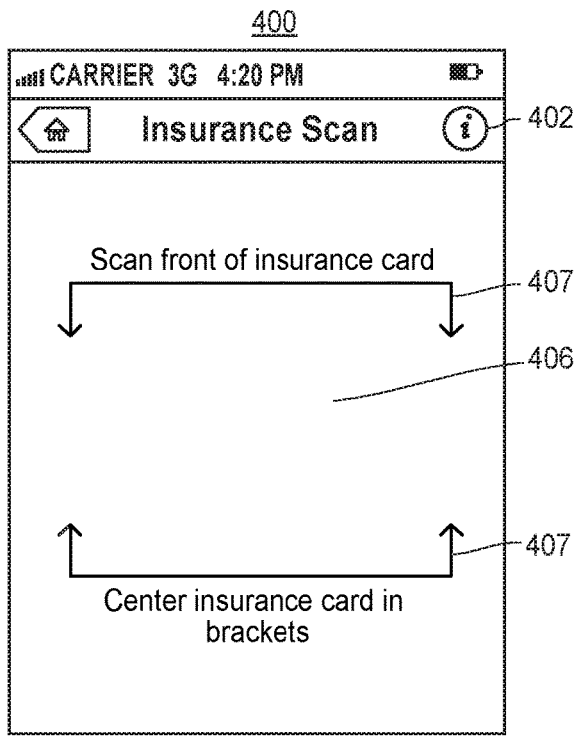
FIG. 4A depicts an image capture screen of a client application in accordance with the presently described embodiments.

In any event, from the home screen 222, the user may select the "Insurance Scan" link 286 to navigate directly to a login screen 300, as shown in FIG. 3, that may be displayed on the mobile device 212 via the client application 266. When a user launches the "Insurance Scan" application for the first time, the client application 266 may display a tutorial screen that explains what "Insurance Scan" is, how "Insurance Scan" works, etc. Additionally, this screen may also be displayed when the user selects the information button 402, as depicted in FIG. 4A. The "Insurance Scan" application may be a separate stand-alone application, or may be included as functionality within another application, such as a pharmacy application or a healthcare provider application. While the "Insurance Scan" application is described as being included on a user's client device, the "Insurance Scan" application may also be included on a healthcare provider's client device. In this manner, the healthcare provider may scan the user's insurance card at a retail store via a pharmacy workstation 128 or other in-store computing device.

In any event, the login screen 300 may include a home button 302 that may cause the client application 266 to return to the home screen 222 of FIG. 2. The login screen 300 also includes an area for logging in to a pharmacy or other healthcare provider account by entering a customer identifier, such as a username 304 and a password 306. The username and password may be associated with a customer record, such as the customer records stored in the database 146 of FIG. 1A. Alternatively, in some implementations the login screen 300 may not include an area for entering a username 304 and password 306. Instead, the login screen 300 may require the user to enter personal information such as a customer name, a customer birth date and/or a customer address to access a customer record. In other implementations, a user may not be required to login to the system.

The login screen 300 includes an area for saving a username 308 and an area for saving a password 310. The user can select the option to save a username 308 or a password 310 to avoid entering the same username or password the next time the user logs in to the system. Once the user enters a username and password, the user may select a login button 312. After the login button is selected, the server 202 verifies that the username and password corresponds to a customer record from the database 146 of FIG. 1A. If the username and password do not correspond to a customer record, the login screen 300 displays an error message and prompts the user to reenter a username and password. If the user does not have an account, the user may select an option to set up a pharmacy or other healthcare provider account 314. This option takes the user to a healthcare registration form application view or web page (not shown) which requires the user to enter personal information and attempts to match the user to an existing customer record from the database 146. In any event, if there is a successful match or the user has set up a new account, the client application 266 may display an image capture screen 400, such as that depicted in FIG. 4A. Alternatively, the user may be prompted to login to the system after capturing the image using the image capture screen 400.

The image capture screen 400 may include an information button 402 that causes the client application 266 to display instructions associated with the insurance policy recordation system 100, or causes a native application or a web browser of the mobile device to navigate to an application view or a web page containing such instructions. The image capture screen 400 also includes an image capture area 406, which may include an image capture frame indicated by marks 407 on the display. Aligning the front of the insurance card within the marks 407 indicated by the image capture frame may cause the application to capture and/or interpret (explained further below) the front of the insurance card. Alternatively, a button (not shown), when activated by a user, may cause the image capture device to capture the front of the insurance card.

Figure 4B:
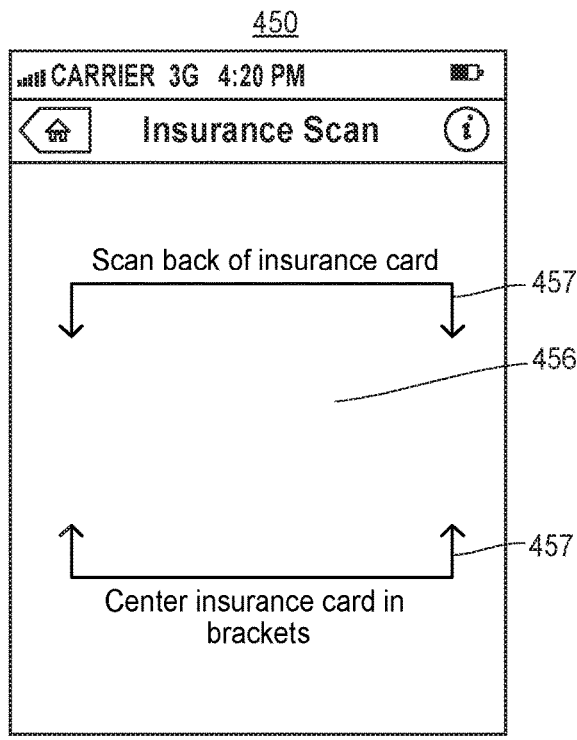
FIG. 4B depicts another image capture screen of a client application in accordance with the presently described embodiments.

The client application 266 may also display another image capture screen 450, such a that depicted in FIG. 4B for capturing the back of the insurance card. The image capture screen 450 also includes an image capture area 456, which may include an image capture frame indicated by marks 457 on the display. Aligning the back of the insurance card within the marks 457 indicated by the image capture frame may cause the application to capture and/or interpret (explained further below) the back of the insurance card. Alternatively, a button (not shown), when activated by a user, may cause the image capture device to capture the back of the insurance card.

After the image is captured, the client application 266 may display a screen (not shown) which displays the captured images of the insurance card to the user and allows for the user to select a "Retake" button or a "Use" button. If the user selects the "Retake" button, the client application 266 displays the image capture screen 400 of FIG. 4A, prompting the user to capture another image of the front of the insurance card. The client application 266 may also display the image capture screen 450 of FIG. 4B, prompting the user to capture another image of the back of the insurance card. If the user selects the "Use" button, the client application 266 transmits the image of the insurance card and the customer identifier to the server 202.

Once the insurance card image is transmitted, the server 202 determines insurance policy information from the insurance card. The insurance policy information generally includes, but is not limited to: a set of insurance policy characteristics described within labels of the insurance card, and a set of insurance policy values corresponding to each of the insurance policy characteristics. The insurance policy characteristics may include: the customer's name, member ID, group number, contract name, insurance provider, insurance plan name, input code corresponding to the insurance plan name, insurance plan effective date, BIN, and PCN. However, the insurance policy information need not include all of the information above and may include additional information not mentioned above. The server 202 may determine the insurance policy information from the insurance card image through the use of computer vision techniques such as OCR, grammar techniques such as NLP, and proximity techniques. This is described in more detail below. In other embodiments, any suitable combination of the OCR, grammar techniques, and/or proximity techniques may be performed on the client device 206-216 via the client application 266.

Figure 4C:
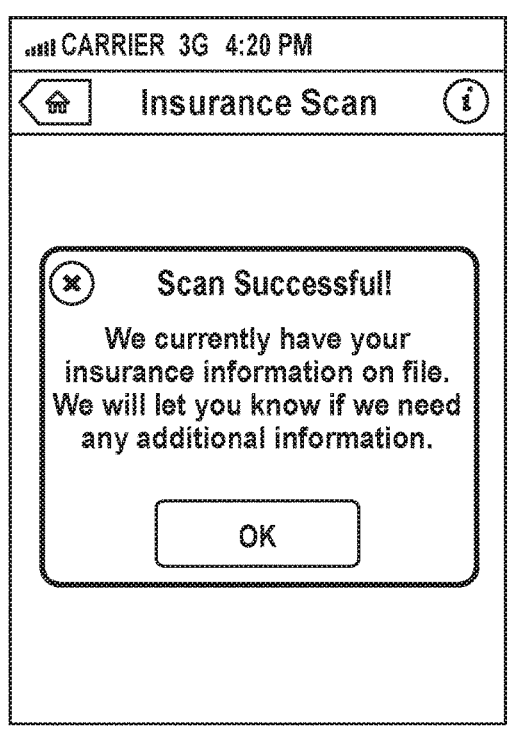
FIG. 4C depicts a successful scan screen of a client application in accordance with the presently described embodiments.

Additionally, having transmitted the insurance card image to the server 202, the client application 266 receives information back from the server 202 indicating, for example, that the insurance policy information has been successfully updated in the customer record. This information may be displayed by the client application 266 in a successful scan screen 470, as depicted in FIG. 4C. In this manner, the customer's insurance policy information is on file and may be used to bill the customer's insurer. For example, a healthcare provider may retrieve the customer's insurance policy information from the server 202 and display the customer's insurance policy information via the healthcare provider's client device 206-216. The healthcare provider's client device 206-216 or the server 202 may then submit a bill to the customer's insurance provider using the insurance policy information. In other embodiments, the client application 266 determines the insurance policy information from the insurance card image, and provides the insurance policy information to the server 202 for updating the customer record. In yet other embodiments, any suitable combination of the client application 266 and the server 202 may analyze the insurance card image to determine the insurance policy information. For example, the client application 266 may perform the OCR techniques, grammar techniques, and/or proximity techniques and the server 202 may validate the insurance policy values in the manner described below.

On the other hand, if the server 202 cannot identify the insurance policy information from the image of the insurance card, the client application 266 may display an error message on an error screen. The error screen may be generated if one or more insurance policy values are not identified from the image of the insurance card, or are not valid insurance policy values based on a comparison with identifiers associated with insurance plans and/or based on a stored set of rules for the insurance policy characteristics.

As mentioned above, upon receiving an insurance card image, the server 202 analyzes the insurance card image to identify labels on the insurance card describing insurance policy characteristics, and to identify insurance policy values corresponding to the insurance policy characteristics. In some embodiments, the server 202 transmits an insurance card image to an OCR server 280 to identify regions in the insurance card image that include text. More specifically, the OCR server 280 may identify a region in the insurance card image that includes consecutive characters, or a set of characters separated by less than a threshold amount of pixels or spaces. The OCR server 280 may generate a bounding box around the identified region and may identify the text included in the bounding box. Then, for each bounding box, the OCR server 280 may provide the server 202 with an indication of the pixel locations of the boundaries of the bounding box, such as the four corners of the bounding box and an indication of the text included in the bounding box, such as "RxBIN." In other embodiments, the server 202 may perform the OCR techniques to generate bounding boxes and identify the text included in each bounding box, such as via an OCR module 238B.

Then the server 202 may analyze the text within each bounding box to identify labels describing insurance policy characteristics and the insurance policy values corresponding to each label. More specifically, for each bounding box, the server 202 may analyze the text in the bounding box to determine whether the text or a portion thereof is a label describing an insurance policy characteristic. The server 202 may store a list of candidate insurance policy characteristics and compare the text in the bounding box to each candidate insurance policy characteristic in the list using regular expressions to determine whether there is an exact match. If there is no exact match, the server 202 may compare a portion of the text in the bounding box to each insurance policy characteristic in the list to determine whether there is an exact match. For example, if the text includes a delimiter such as a colon, hyphen, comma, parentheses, quotation marks, etc., the server 202 may compare a portion of the text before the delimiter to each insurance policy characteristic in the list to determine whether there is an exact match. In another example, the server 202 may compare the first character in the text to the first character in each insurance policy characteristic, and eliminate insurance policy characteristics having first characters that do not match. Then the server 202 may compare the second character in the text to the second character in the remaining insurance policy characteristics, and eliminate remaining insurance policy characteristics having second characters that do not match. The server 202 may repeat this process for each character until only one insurance policy characteristic remains. If the entirety of the text for the remaining insurance policy characteristic matches with a portion of the text in the bounding box, the server 202 may determine that the bounding box includes a label describing the remaining insurance policy characteristic. Otherwise, the server 202 may determine a likelihood or probability that the text in the bounding box matches the remaining insurance policy characteristic based on the amount or percentage of characters from the insurance policy characteristic that match with the text in the bounding box. Additionally, in some embodiments, the server 202 may repeat this process starting with the second character in the text and may compare the second character in the text to the first character in each insurance policy characteristic, and eliminate insurance policy characteristics having first characters that do not match. Then the server 202 may compare the third character in the text to the second character in the remaining insurance policy characteristics, and eliminate remaining insurance policy characteristics having second characters that do not match. The server 202 may continue to start with the next character in the text until an exact match is identified.

In yet another example, the server 202 may remove the last character of the text in the bounding box and compare the remaining portion to each insurance policy characteristic in the list to determine whether there is an exact match. If no exact match is found, the server 202 may remove the second to last character of the text, compare the remaining portion to each insurance policy characteristic in the list to determine whether there is an exact match, and repeat this process until an exact match is found or each of the characters have been removed.

If the server 202 is unable to identify an exact match from the text in a bounding box with one of the insurance policy characteristics, the server 202 may provide the text to an NLP server 290 to identify likelihoods or probabilities that the text or a portion thereof corresponds to each of the insurance policy characteristics. The NLP server 290 may store a predetermined list of candidate insurance policy characteristics, such as member ID, group number, contract name, insurance provider, insurance plan name, input code, insurance plan effective date, BIN, and PCN. For each candidate insurance policy characteristic, the NLP server 290 may store a list of terms, abbreviations, synonyms, nicknames, etc., that may be used to describe the insurance policy characteristic, for example in a label. The NLP server 290 may then compare the text string or portions of the text string to the list of terms, abbreviations, synonyms, nicknames, etc., that may be used to describe a particular insurance policy characteristic and may assign a likelihood or probability that the text string or a portion of the text string corresponds to the particular insurance policy characteristic based on how closely the text string or portion of the text string matches the terms, abbreviations, synonyms, nicknames, etc., associated with the particular insurance policy characteristic. The NLP server 290 may assign a likelihood or probability for each candidate insurance policy characteristic and may select the candidate insurance policy characteristic having the highest likelihood or probability as the insurance policy characteristic. The NLP server 290 may also repeat this process for various portions of the text string and may select the portion of the text string having the highest likelihood or probability. Then the NLP server 290 may provide the identified portion of the text string, the identified insurance policy characteristic, and an indication of the likelihood or probability that the identified portion of the text string corresponds to the identified insurance policy characteristic to the server 202. When the candidate insurance policy characteristic having the highest likelihood or probability is less than a threshold likelihood or probability (e.g., less than 50%), the NLP server 290 may indicate that no match was identified for the text string or any portion thereof.

In other embodiments, the server 202 may perform the NLP techniques to perform natural language processing on the regions of text to identify an insurance policy characteristic that corresponds to a text string or a portion thereof, such as via an NLP module 238C.

Figure 5A:
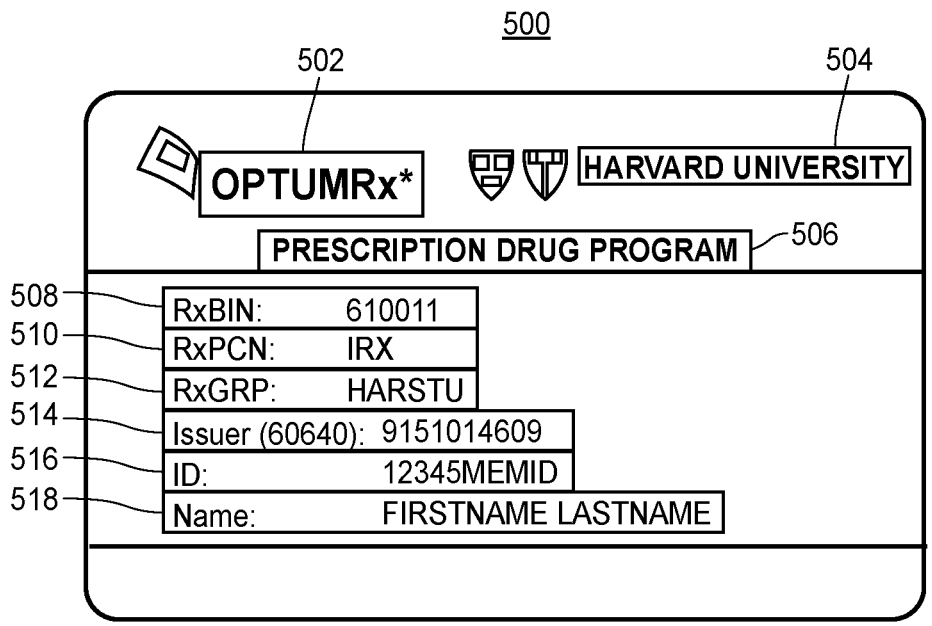
FIG. 5A depicts an example optical character recognition analysis of an image of an insurance card including bounding boxes around regions of text in accordance with the presently described embodiments.

FIG. 5A illustrates an example image of an insurance card 500 including bounding boxes 502-518 around regions of text on the insurance card 500 which may be identified by the server 202 or the OCR server 280. The server 202 or the OCR server 280 may determine that a first bounding box 502 includes the text "OPTUMRx," a second bounding box 504 includes the text "HARVARD UNIVERSITY," a third bounding box 506 includes the text "PRESCRIPTION DRUG PROGRAM," a fourth bounding box 508 includes the text "RxBIN: 610011," a fifth bounding box 510 includes the text "RxPCN: IRX," a sixth bounding box 512 includes the text "RxGRP: HARSTU," a seventh bounding box 514 includes the text "Issuer (80840): 9151014609," an eighth bounding box 516 includes the text "ID: 12345MEMID," and a ninth bounding box 518 includes the text "Name: FIRSTNAME LASTNAME."

For each bounding box, the server 202 may compare the text within the bounding box to the list of candidate insurance policy characteristics to determine whether the bounding box includes a label describing an insurance policy characteristic. As described above, the candidate insurance policy characteristics may include: name, member ID, group number, contract name, insurance provider, insurance plan name, input code, effective date, BIN, and PCN. When comparing the text with the candidate insurance policy characteristics to find an exact match with the text or a portion thereof (e.g., using regular expressions), the server 202 may identify the fourth bounding box 508 as including a label describing the BIN, the fifth bounding box 510 as including a label describing the PCN, and the ninth bounding box 518 as including a label describing the name.

The server 202 may also provide the text or bounding boxes including text without an exact match to an NLP server 290 to identify likelihoods or probabilities that the text or a portion thereof corresponds to each of the candidate insurance policy characteristics. More specifically, the server 202 may provide the text in the first 502, second 504, third 506, sixth 512, seventh 514, and eighth 516 bounding boxes to the NLP server 290 or may perform a natural language processing analysis for example, via an NLP module 238C. The server 202 or the NLP server 238C may determine that the term "GRP" in the sixth bounding box 512 corresponds to the group number candidate insurance policy characteristic. For example, the NLP server 290 may store the abbreviation "GRP" in association with the group number candidate insurance policy characteristic. The NLP server 90 may provide to the server 202 an indication of the likelihood or probability that "GRP" corresponds to the group number candidate insurance policy characteristic which exceeds a threshold likelihood or probability. The server 202 or the NLP server 238C may also determine that the term "ID" in the eighth bounding box 516 corresponds to the member ID candidate insurance policy characteristic. For example, the NLP server 290 may store the term "ID" in association with the member ID candidate insurance policy characteristic. The NLP server 90 may provide to the server 202 an indication of the likelihood or probability that "ID" corresponds to the member ID candidate insurance policy characteristic which exceeds a threshold likelihood or probability.

In any event, when labels describing insurance policy characteristics are identified in the insurance card image, the server 202 may identify insurance policy values corresponding to the insurance policy characteristics. In some embodiments, when the server 202 identifies a portion of the text in a bounding box as a label describing an insurance policy characteristic, the server 202 may determine that the remaining portion is the insurance policy value corresponding to the insurance policy characteristic. In some embodiments, the server 202 may determine whether there is a delimiter after the portion of the text identified as a label, and may determine that the remaining portion after the delimiter is an insurance policy value. For example, for the third bounding box 508, the server 202 may determine that the insurance policy value corresponding to the BIN is the remaining text in the third bounding box 508 after the ":" or "610011." For the fourth bounding box 510, the server 202 may determine that the insurance policy value corresponding to the PCN is the remaining text in the fourth bounding box 510 after the ":" or "IRX." For the fifth bounding box 512, the server 202 may determine that the insurance policy value corresponding to the group number is the remaining text in the fifth bounding box 512 after the ":" or "HARSTU." For the seventh bounding box 516, the server 202 may determine that the insurance policy value corresponding to the member ID is the remaining text in the seventh bounding box 516 after the ":" or "12345MEMID." For the eighth bounding box 518, the server 202 may determine that the insurance policy value corresponding to the customer's name is the remaining text in the eighth bounding box 518 after the ":" or "FIRSTNAME LASTNAME."

If there is no delimiter after the portion of the text identified as a label, there is no remaining portion of text in the bounding box after the label or the delimiter, and/or the remaining portion of the text does not comply with requirements or a set of rules for a valid insurance policy value, the server 202 may determine that the insurance policy value is included within another bounding box. This is described with reference to FIGS. 5B and 5C.

Figure 5B:
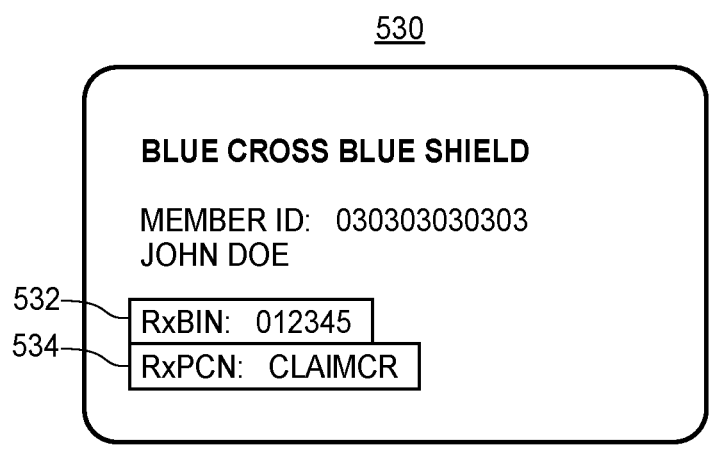
FIG. 5B depicts another example optical character recognition analysis of an image of another insurance card.
Figure 5C:
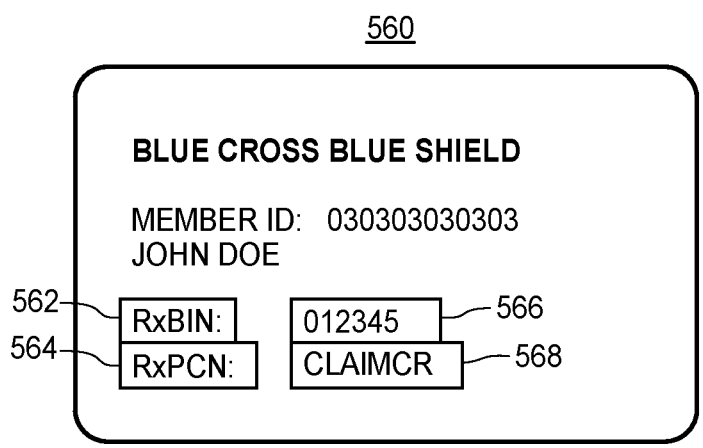
FIG. 5C depicts yet another example optical character recognition analysis of an image of the other insurance card.

FIGS. 5B and 5C illustrate two examples of the same image 530, 560 of an insurance card, where in the first example image 530 depicted in FIG. 5B, a first bounding box 532 is generated around the text "RxBIN: 012345," and a second bounding box 534 is generated around the text "RxPCN: CLAIMCR." In the second example image 560, two bounding boxes 562, 564 are generated around the text "RxBIN:" and "012345," respectively, and two bounding boxes 564, 566 are generated around the text "RxPCN:" and "CLAIMCR," respectively. Similar to the example insurance card image 500 in FIG. 5A, the server 202 may determine that the remaining portion of text after the delimiter in the bounding box 532 ("012345") is an insurance policy value. The server 202 may also determine that the remaining portion of text after the delimiter in the bounding box 534 ("CLAIMCR") is an insurance policy value. However, in the bounding box 562 there is no remaining text after the delimiter. Accordingly, the server 202 may identify a second bounding box which includes the insurance policy value corresponding to the label in the first bounding box 562, where the second bounding box is different from the first bounding box 562.

To identify the second bounding box which includes the insurance policy value, the server 202 may utilize a proximity algorithm. More specifically, each of the other bounding boxes 564-568 may be candidate second bounding boxes, where one of the candidate second bounding boxes is identified as the second bounding box which includes the insurance policy value. The proximity algorithm may analyze the pixel positions of each of the other bounding boxes 564-568 and identify the bounding box closest to the bounding box 562 with the label. In some embodiments, the proximity algorithm includes for each of the other bounding boxes 564-568, determining the starting pixel position of the candidate second bounding box 564-568 (e.g. using x,y coordinates). The starting position of a bounding box may be the upper left corner of the bounding box. Then the server 202 determines the difference between the horizontal starting position (e.g., the x position) of the candidate second bounding box 564-568 and the horizontal starting position of the bounding box 562 with the label. Moreover, the server 202 determines the difference between the vertical starting position (e.g., the y position) of the candidate second bounding box 564-568 and the vertical starting position of the bounding box 562 with the label. The differences may be used to create an array of image coordinate differentials (also referred to herein as "differentials"), where the image coordinate differential for a bounding box is the horizontal and vertical difference between the starting position for the bounding box and the starting position for the bounding box with the label. For example, the image coordinate differential for a candidate second bounding box may be (100, 50) indicating that the starting position of the candidate second bounding box has a horizontal differential of 100 from the starting position of the bounding box with the label and that the starting position of the candidate second bounding box has a vertical differential of 50 from the starting position of the bounding box with the label.

The server 202 then identifies the candidate second bounding box 564-568 having the smallest combined differential for the horizontal and vertical positions of the first bounding box 562 as the second bounding box. The combined differential may be calculated in any suitable manner. In some embodiments, the server 202 filters candidate second bounding boxes 564-568 which are to the left of the label in the first bounding box (e.g., having a negative horizontal differential). In this example, none of the candidate second bounding boxes 564-568 are filtered out since none of the candidate second bounding boxes 564-568 are to the left of the first bounding box 562. Then the server 202 determines the absolute value of the vertical differentials of the remaining candidate second bounding boxes 564-568.

The server 202 may identify the candidate second bounding box 564-568 having the smallest vertical differential as the second bounding box. If multiple candidate second bounding boxes 564-568 have the same smallest vertical differential, the server may identify the candidate second bounding box 564-568 having the smallest horizontal differential of the candidate second bounding boxes having the same smallest vertical differential. In this example, the candidate second bounding box 566 has the smallest vertical differential of zero while the other candidate second bounding boxes 564, 568 having larger vertical differentials. Accordingly, the server 202 identifies the candidate second bounding box 566 as the second bounding box, and determines that the text in the second bounding box 566, "012345," is the insurance policy value corresponding to the BIN insurance policy characteristic. If multiple candidate second bounding boxes had the same smallest vertical differential (e.g., zero), the server 202 would identify the candidate second bounding box having the smallest horizontal differential of the candidate second bounding boxes with the smallest vertical differential as the second bounding box.

In other embodiments, the server 202 may calculate a combined vertical and horizontal differential for each candidate second bounding box. For example, the combined vertical and horizontal differential may be the square root of the sum of the squares of the vertical and horizontal differentials. In another example, the combined vertical and horizontal differential may be the sum of the absolute values of the vertical and horizontal differentials. Then the server 202 may identify the second bounding box as the candidate second bounding box having the smallest combined differential from the first bounding box 562.

In any event, when labels describing insurance policy characteristics and corresponding insurance policy values for the labels are identified, the server 202 may analyze the insurance policy values to determine whether each insurance policy values is a valid insurance policy value. The validity of an insurance policy value may depend on the insurance policy characteristic which corresponds to the insurance policy value. For example, a BIN may be a six digit number, while a PCN may be a combination of letters and numbers. Accordingly, to determine the validity of insurance policy values, the server 202 may retrieve a list of insurance plans and one or more identifiers for each insurance plan for example, from a database 146. Furthermore, to determine the validity of insurance policy values, the server 202 may retrieve a set of rules for the insurance policy values corresponding to each of the insurance policy characteristics.

For example, for the BIN insurance policy characteristic, the set of rules may be to convert all instances of the letter 'O' to the number zero, convert all instances of the letters 'I,' 'J', and 'L' to the number one and determine whether the resulting insurance policy value is six digits long. In some embodiments, if the resulting insurance policy value is not six digits long, the server 202 may determine that the insurance policy value is invalid and may not store the identified insurance policy value as a BIN. In other embodiments, if the resulting insurance policy value is not six digits long, the server 202 may add zeroes to the beginning or end of the insurance policy value such that the insurance policy value is six digits long.

In another example, for the PCN insurance policy characteristic, the set of rules may be to convert all instances of the letter 'O' to the number zero, and convert all instances of the letters 'I,' and 'L' to the number one.

Then the server 202 may compare at least some of the insurance policy values to the identifiers included in each insurance plan. For example, the server 202 may store the BIN and/or PCN for each insurance plan. An example of the stored insurance plan information is included in the data table 600 as shown in FIG. 6. For each insurance plan, the server 202 may store the contract name 602, an input code corresponding to the insurance plan name 604, the insurance plan name 606, the insurance plan effective date 608, the BIN 610, and the PCN 612. However, this is merely one example of the insurance plan information which may be stored for each insurance plan. The insurance plan information need not include all of the information in the data table 600 and may include additional information not included in the data table 600. In any event, the server 202 may compare at least some of the insurance policy values to the identifiers 602-612 included in each insurance plan to identify a matching insurance plan for the customer. For example, the server 202 may compare the insurance policy values corresponding to the BIN and/or the PCN from the insurance card to the BIN 610 and PCN 612 values in the data table 600. In some embodiments, the server 202 may convert the insurance policy value corresponding to the BIN using the stored set of rules for the BIN and may convert the insurance policy value for the PCN using the stored set of rules for the PCN before comparing the converted insurance policy values to the BIN 610 and PCN 612 values in the data table 600. Also in some embodiments, because the PCN may include both numbers and letters, the server 202 may convert the PCN 612 values in the data table 600 by converting all instances of the letter 'O' to the number zero, and converting all instances of the letters 'I,' and 'L' to the number one. The server 202 may then compare the converted insurance policy value corresponding to the PCN from the insurance card image to the converted PCN values from the data table 600 to identify a match.

If the converted insurance policy value corresponding to the BIN from the insurance card image matches a BIN value from the data table 600, the server 202 may determine whether the converted insurance policy value corresponding to the PCN from the insurance card image also matches the PCN value for the same insurance plan from the data table 600. If one or both of the converted insurance policy values corresponding to the BIN and the PCN from the insurance card image matches one or both of the BIN and PCN values from the data table 600, the server 202 may determine that the insurance policy values are valid and that they correspond to the matching insurance plan. Additionally, the server 202 may obtain additional information from the data table 600 which is associated with the matching insurance plan which may not be included in the insurance card image. For example, if the server 202 determines that the insurance policy values corresponding to the BIN and/or PCN match the BIN and/or PCN values in the second row of the data table 600, the server 202 may also determine that the customer's insurance contract is with Prime Therapeutics, the input code is "ALBCWRI," the insurance plan name is "Prime Therapeutics ALBC Work Related Injury WRI," and the plan effective date is "7/1/10." The server 202 may also use the additional information from the data table 600 to further verify the validity of the insurance policy values. In the example insurance card image 500 shown in FIG. 5A, the first bounding box 502 includes the text "OPTUMRx." If the server 202 determines that the customer's insurance contract is with OPTUMRx based on the comparison to the data table 600, the text from the first bounding box 502 may be used to further verify that the insurance policy values are accurate.

If, on the other hand, the converted insurance policy values from the insurance card image do not match any of the identifiers associated with the insurance plans, the server 202 may perform additional natural language processing techniques and/or adjust the results from the proximity algorithm to find matching insurance policy values. For example, if a label was identified using regular expressions, the server 202 may analyze the text once again using natural language processing to see if the text corresponds to a different insurance policy characteristic. In another example, the server 202 may select a second bounding box having the next smallest differential to determine whether the second bounding box having the next smallest differential includes a valid insurance policy value.

In any event, if the converted insurance policy values from the insurance card image still do not match any of the identifiers associated with the insurance plans, the server 202 may generate an error message on an error screen which may be displayed on the customer's client device 206-216 for example, via the client application 266. The error screen may be generated if more than a threshold number of insurance policy values are not identified from the image of the insurance card, or are not valid insurance policy values based on a comparison with identifiers associated with insurance plans and/or based on a stored set of rules for the insurance policy characteristics. In this manner, the customer may submit new images of the insurance card which may be analyzed in the manner described above to identify valid insurance policy values. In other embodiments, the server 202 may flag the insurance card image for manual review and entry.

If there is a match, the server 202 may provide the identified insurance policy values for corresponding insurance policy characteristics to a database 146 for storage. Accordingly, the customer record may be updated with the insurance policy information. FIG. 7 illustrates an example data table 700 including customer records updated to include insurance policy information. The data table 700 may include a user ID 702, and the customer name 704. The data table 700 may also include other customer biographical information (not shown), such as a customer address, a customer phone number, a customer birth date, etc. Furthermore, the data table 700 may include insurance policy information for the customer, such as a contract name 706, an input code corresponding to an insurance plan name 708, an insurance plan name 710, a BIN 712, a PCN 714, a member ID 716, a group number 718, and an insurance provider (not shown). When insurance policy information has not been obtained for a customer, the insurance policy information may be left blank in the data table 700. By storing a common set of insurance policy characteristics in a data table 700, the server 202 converts non-standardized insurance cards into a standardized format or standardized customer record including the same set of insurance policy characteristics and corresponding values for each customer.

In any event, as described above, when the server 202 identifies insurance policy values from the insurance card image and/or determines that the insurance policy values are valid, the server 202 updates the customer record with the identified insurance policy values. The customer record may be updated by providing the identified insurance policy values to a database for storage in association with the customer's information. In some embodiments, when the server 202 identifies insurance policy values for each of the insurance policy characteristics, a threshold number of insurance policy characteristics, and/or an identified subset of the insurance policy characteristics, the server 202 may determine that no manual intervention is needed. For example, if the server 202 identifies insurance policy values for the member ID, insurance plan name, BIN, and PCN, the server 202 may determine that no manual intervention is needed. On the other hand, if the server 202 does not identify insurance policy values for each of the insurance policy characteristics, a threshold number of insurance policy characteristics, and/or an identified subset of the insurance policy characteristics, the server 202 may determine that manual intervention is needed. Accordingly, the server 202 may provide a notification to a healthcare provider's client device to review the identified insurance policy values and/or the image of the insurance card.

While the database 146 may be a pharmacy database, such as the database 146, the server 202 may also provide the identified insurance policy values to any suitable healthcare database, such an electronic health record (EHR) database. In this manner, the server 202 may identify insurance policy information from a customer's insurance card and provide the insurance policy information for storage in customer records corresponding to several different health-related services, so that the customer may scan her insurance card once and have her insurance policy information on file with each of her healthcare providers.

Figure 8:
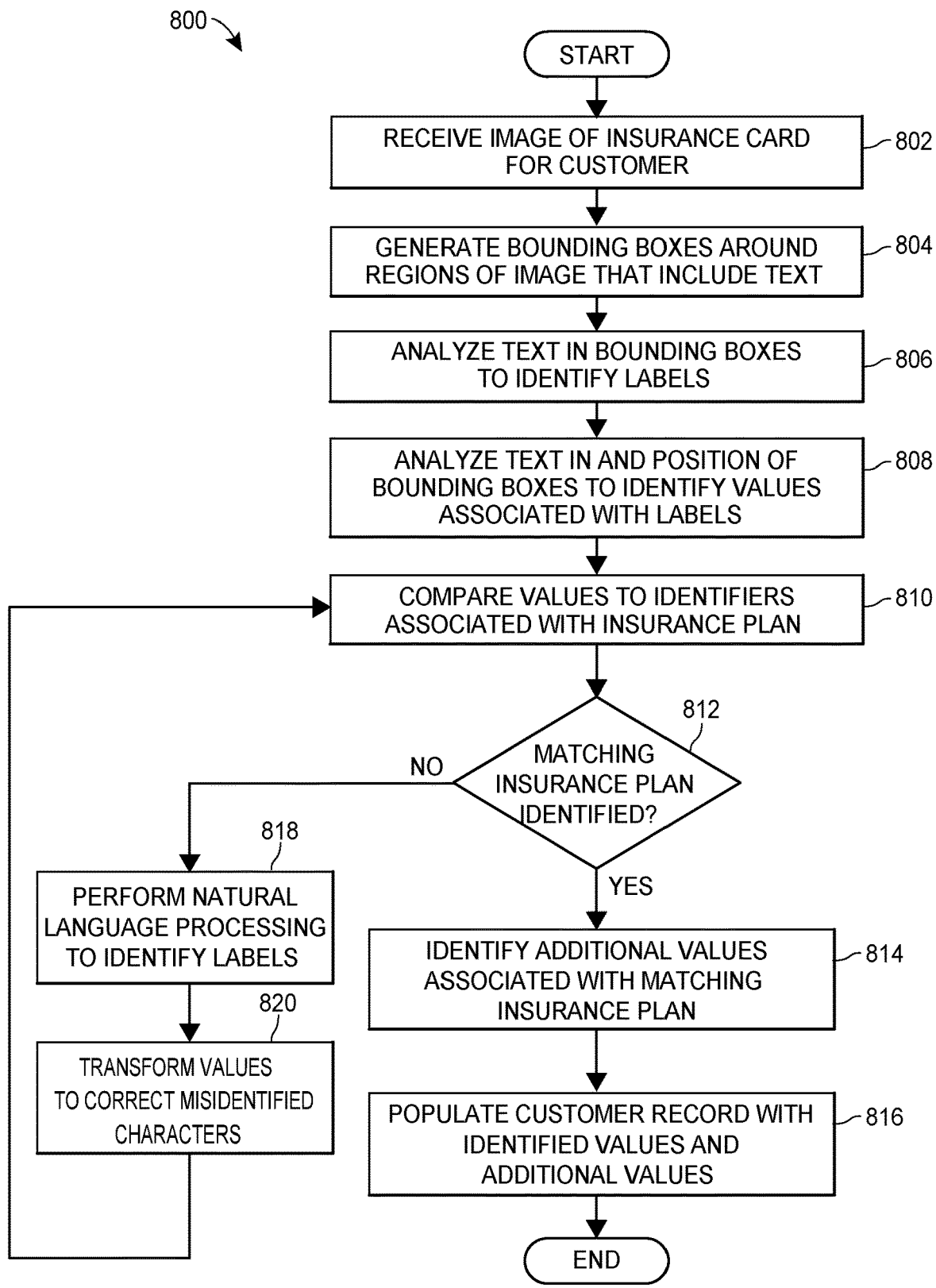
FIG. 8 depicts a flow diagram representing an exemplary server-side method for implementing the insurance policy recordation system in accordance with the presently described embodiments.

FIG. 8 depicts a flow diagram representing an exemplary server-side method 800 for automatically extracting information from an insurance card. The method 800 may be executed on the server 202. In some embodiments, the method 800 may be implemented in a set of instructions stored on a non-transitory computer-readable memory and executable on one or more processors of the server 202. For example, the method 800 may be performed by the software modules 238A-238F as shown in FIG. 1C. In other embodiments, the method 800 or at least some of the steps of the method 800 may be executed on the client device 206-216. For example, the client device 206-216 may perform the OCR techniques (block 804), grammar techniques (blocks 806, 818), and/or proximity techniques (block 808) and the server 202 may validate the insurance policy values (blocks 810, 820) and populate the customer record with the insurance policy values (block 816).

At block 802, an image of an insurance card for a customer and a customer identifier which identifies the customer is received. For example, the customer may scan the front and/or back of her insurance card via an insurance scan application on her client device 206-216 and transmit the image of the insurance card to the server 202. In another example, the insurance card may be scanned at a pharmacy workstation 128 or other in-store computing device.

Then at block 804, the server 202 analyzes the insurance card image to identify regions of text in the insurance card image. More specifically, the server 202 or an OCR server 280 may generate bounding boxes around regions of the insurance card image that include text. The server 202 or OCR server 280 may identify the starting pixel position of a bounding box or upper left corner of the bounding box, the height of the bounding box, and/or the width of the bounding box. Moreover, the server 202 or the OCR server 280 may identify the text within the bounding box as a set of characters.

For each bounding box, the server 202 analyzes the text within the bounding box to determine whether the text or a portion thereof includes a label describing an insurance policy characteristic (block 806). The server 202 may store a list of candidate insurance policy characteristics and compare the text in the bounding box to each candidate insurance policy characteristic in the list to determine whether there is an exact match. If there is no exact match, the server 202 may compare a portion of the text in the bounding box to each insurance policy characteristic in the list to determine whether there is an exact match. For example, if the text includes a delimiter such as a colon, hyphen, comma, parentheses, quotation marks, etc., the server 202 may compare a portion of the text before the delimiter to each insurance policy characteristic in the list to determine whether there is an exact match.

In another example, the server 202 may compare the first character in the text to the first character in each insurance policy characteristic, and eliminate insurance policy characteristics having first characters that do not match. Then the server 202 may compare the second character in the text to the second character in the remaining insurance policy characteristics, and eliminate remaining insurance policy characteristics having second characters that do not match. The server 202 may repeat this process for each character until only one insurance policy characteristic remains. If the entirety of the text for the remaining insurance policy characteristic matches with a portion of the text in the bounding box, the server 202 may determine that the bounding box includes a label describing the remaining insurance policy characteristic. Otherwise, the server 202 may determine a likelihood or probability that the text in the bounding box matches the remaining insurance policy characteristic based on the amount or percentage of characters from the insurance policy characteristic that match with the text in the bounding box. Additionally, in some embodiments, the server 202 may repeat this process starting with the second character in the text and may compare the second character in the text to the first character in each insurance policy characteristic, and eliminate insurance policy characteristics having first characters that do not match. Then the server 202 may compare the third character in the text to the second character in the remaining insurance policy characteristics, and eliminate remaining insurance policy characteristics having second characters that do not match. The server 202 may continue to start with the next character in the text until an exact match is identified.

In yet another example, the server 202 may remove the last character of the text in the bounding box and compare the remaining portion to each insurance policy characteristic in the list to determine whether there is an exact match. If no exact match is found, the server 202 may remove the second to last character of the text, compare the remaining portion to each insurance policy characteristic in the list to determine whether there is an exact match, and repeat this process until an exact match is found or each of the characters have been removed.

If the server 202 is unable to identify an exact match from the text in a bounding box with one of the insurance policy characteristics, the server 202 or the NLP server 290 may perform natural language processing to identify likelihoods or probabilities that the text or a portion thereof corresponds to each of the insurance policy characteristics. For each candidate insurance policy characteristic, the server 202 or the NLP server 290 may store a list of terms, abbreviations, synonyms, nicknames, etc., that may be used to describe the insurance policy characteristic, for example in a label. The server 202 or the NLP server 290 may then compare the text string or portions of the text string to the list of terms, abbreviations, synonyms, nicknames, etc., that may be used to describe a particular insurance policy characteristic and may assign a likelihood or probability that the text string or a portion of the text string corresponds to the particular insurance policy characteristic based on how closely the text string or portion of the text string matches the terms, abbreviations, synonyms, nicknames, etc., associated with the particular insurance policy characteristic. The server 202 or the NLP server 290 may assign a likelihood or probability for each candidate insurance policy characteristic and may select the candidate insurance policy characteristic having the highest likelihood or probability as the insurance policy characteristic. The server 202 or the NLP server 290 may also repeat this process for various portions of the text string and may select the portion of the text string having the highest likelihood or probability. Then the NLP server 290 may provide the identified portion of the text string, the identified insurance policy characteristic, and an indication of the likelihood or probability that the identified portion of the text string corresponds to the identified insurance policy characteristic to the server 202. When the candidate insurance policy characteristic having the highest likelihood or probability is less than a threshold likelihood or probability (e.g., less than 50%), the NLP server 290 may indicate that no match was identified for the text string or any portion thereof.

Then at block 808, the server 202 may identify insurance policy values corresponding to the insurance policy characteristics. In some embodiments, when the server 202 identifies a portion of the text in a bounding box as a label describing an insurance policy characteristic, the server 202 may determine that the remaining portion is the insurance policy value corresponding to the insurance policy characteristic. In some embodiments, the server 202 may determine whether there is a delimiter after the portion of the text identified as a label, and may determine that the remaining portion after the delimiter is an insurance policy value. If there is no delimiter after the portion of the text identified as a label, there is no remaining portion of text in the bounding box after the label or the delimiter, and/or the remaining portion of the text does not comply with requirements or a set of rules for a valid insurance policy value, the server 202 may determine that the insurance policy value is included within another bounding box. Accordingly, the server 202 may identify a second bounding box which includes the insurance policy value corresponding to the label in the first bounding box.

To identify the second bounding box which includes the insurance policy value, the server 202 may utilize a proximity algorithm. More specifically, each of the other bounding boxes may be candidate second bounding boxes, where one of the candidate second bounding boxes is identified as the second bounding box which includes the insurance policy value. The proximity algorithm may analyze the pixel positions of each of the other bounding boxes and identify the bounding box closest to the bounding box with the label. In some embodiments, the proximity algorithm includes for each of the other bounding boxes, determining the starting pixel position of the candidate second bounding box. Then the server 202 determines the difference between the horizontal starting position (e.g., the x position) of the candidate second bounding box and the horizontal starting position of the bounding box with the label. Moreover, the server 202 determines the difference between the vertical starting position (e.g., the y position) of the candidate second bounding box and the vertical starting position of the bounding box with the label. The server 202 then identifies the candidate second bounding box having the smallest combined differential between the horizontal and vertical positions of the first bounding box as the second bounding box. Then the server 202 identifies the text in the second bounding box as an insurance policy value corresponding to the insurance policy characteristic included in the first bounding box.

In response to identifying insurance policy values corresponding to the insurance policy characteristics, the server 202 may analyze the insurance policy values to determine whether each insurance policy values is a valid insurance policy value. To determine the validity of insurance policy values, the server 202 may retrieve a list of insurance plans and one or more identifiers for each insurance plan for example, from a database 146. Then the server 202 may compare at least some of the insurance policy values to the identifiers included in each insurance plan (block 810). For example, the server 202 may store the BIN and/or PCN for each insurance plan.

If the insurance policy values match one or more of the identifiers included in one of the insurance plans, the server 202 may determine that the insurance policy values are valid and that they correspond to the matching insurance plan. Additionally, the server 202 may obtain additional information including additional insurance policy characteristics and additional insurance policy values from the data which is associated with the matching insurance plan and which may not be included in the insurance card image (block 814). For example, if the server 202 determines that the insurance policy values corresponding to the BIN and/or PCN match the BIN and/or PCN values associated with a particular insurance plan, the server 202 may also determine the customer's insurance contract, input code, insurance plan name, plan effective data, etc., from the information stored in associated with the particular insurance plan. Then the server 202 may populate the customer record with the identified insurance policy values and/or the additional insurance policy values stored with the matching insurance plan (block 816). For example, the server 202 may provide the identified insurance policy values for corresponding insurance policy characteristics to a database 146 for storage. Accordingly, the customer record may be updated with the insurance policy information. The customer record may be updated by providing the identified insurance policy values to a database for storage in association with the customer's information. In some embodiments, when the server 202 identifies insurance policy values for each of the insurance policy characteristics, a threshold number of insurance policy characteristics, and/or an identified subset of the insurance policy characteristics, the server 202 may determine that no manual intervention is needed.

On the other hand, if the insurance policy values do not match one or more of the identifiers included in one of the insurance plans, the server 202 may perform additional natural language processing techniques and/or adjust the results from the proximity algorithm to find matching insurance policy values (block 818). For example, if a label was identified using regular expressions, the server 202 may analyze the text once again using natural language processing to see if the text corresponds to a different insurance policy characteristic. In another example, the server 202 may select a second bounding box having the next smallest differential to determine whether the second bounding box having the next smallest differential includes a valid insurance policy value. Furthermore, the server 202 may retrieve a set of rules for the insurance policy values corresponding to each of the insurance policy characteristics and may convert the insurance policy values according to the retrieved set of rules (block 820).

For example, for the BIN insurance policy characteristic, the set of rules may be to convert all instances of the letter 'O' to the number zero, convert all instances of the letters 'I,' 'J', and 'L' to the number one and determine whether the resulting insurance policy value is six digits long. In some embodiments, if the resulting insurance policy value is not six digits long, the server 202 may determine that the insurance policy value is invalid and may not store the identified insurance policy value as a BIN. In other embodiments, if the resulting insurance policy value is not six digits long, the server 202 may add zeroes to the beginning or end of the insurance policy value such that the insurance policy value is six digits long.

In another example, for the PCN insurance policy characteristic, the set of rules may be to convert all instances of the letter 'O' to the number zero, and convert all instances of the letters 'I' and 'L' to the number one. The server 202 may convert the insurance policy values using this set of rules and may also convert the identifiers associated with the insurance plans using this set of rules. Then the server 202 may compare the converted insurance policy values to the identifiers included in each insurance plan (block 810). When a converted insurance policy value matches with an identifier or a converted identifier, the server 202 determines that the identifier associated with the insurance plan is the insurance policy value. For example, a stored identifier for an insurance plan may include the PCN value: IMA1NC. The server 202 may identify an insurance policy value corresponding to the PCN insurance policy characteristic of LMA1NC. When comparing the insurance policy value to the identifier, the set of rules for the PCN insurance policy characteristic may be to convert all instances of the letter 'O' to the number zero, and convert all instances of the letters 'I' and 'L' to the number one resulting in the converted insurance policy value of 1MA1NC and the converted PCN value of 1MA1NC. Because the converted insurance policy value matches the converted PCN value, the server 202 may determine that the insurance policy value is valid. The server 202 may also determine that the insurance policy value is IMA1NC based on the stored identifier for the insurance plan.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

What is claimed:

1. A method of extracting information from an insurance card, the method executed by one or more computer processors programmed to perform the method, the method comprising:
   storing, for each of a plurality of customers, a standardized customer record including a customer identifier indicative of the customer;

storing, for each of a plurality of insurance plans, one or more identifiers associated with the insurance plan;

receiving, at the one or more processors, from a client device, over a network, the customer identifier for one of the plurality of customers and an image of an insurance card for the customer, wherein the insurance card is associated with an insurance plan and the image of the insurance card is captured by a camera in the client device; and converting information included on the image of the insurance card into a standardized format including a set of insurance policy characteristics associated with the insurance plan and corresponding insurance policy values including:

analyzing, by the one or more processors, the image of the insurance card to identify an insurance policy value for each of a plurality of insurance policy characteristics associated with the insurance plan, including:

generating, by the one or more processors, bounding boxes around regions of the image of the insurance card that include text;

identifying, by the one or more processors, a label within a first bounding box of the bounding boxes describing one of the plurality of insurance policy characteristics; and identifying, by the one or more processors, a second bounding box of the bounding boxes including the insurance policy value associated with the identified label by determining image coordinates for each bounding box, creating an array of image coordinate differentials comparing the location of each bounding box to the location of the first bounding box, filtering out at least one of the bounding boxes located to the left of the first bounding box according to the array of image coordinate differentials, and identifying, as the second bounding box, a bounding box of the filtered bounding boxes which is closest to the first bounding box according to the array of image coordinate differentials;

comparing, by the one or more processors, one or more of the identified insurance policy values to the one or more identifiers associated with each of the plurality of insurance plans;

in response to identifying a match between the one or more identified insurance policy values and the one or more identifiers associated with one of the plurality of insurance plans, providing, by the one or more processors, the standardized set of insurance policy characteristics and the corresponding insurance policy values to be stored in the standardized customer record of the customer;

updating the standardized customer record for the customer with the standardized set of insurance policy characteristics and the corresponding insurance policy values; and submitting the standardized set of insurance policy characteristics and the corresponding insurance policy values to bill an insurance provider.

2. The method of claim 1, wherein analyzing the image of the insurance card to identify the insurance policy value for each of the plurality of insurance policy characteristics associated with the insurance plan includes analyzing the image of the insurance card to identify the insurance policy value for each of the plurality of insurance policy characteristics, the plurality of insurance policy characteristics including two or more of: a policyholder name, a policyholder identifier, a policyholder group number, a contract name, an insurance provider, an insurance plan name, an input code corresponding to the insurance plan name, an insurance plan effective date, a bank identification number, or a primary care network.

3. The method of claim 2, wherein storing the one or more identifiers associated with the insurance plan includes storing, for each of the plurality of insurance plans, a bank identification number or a primary care network associated with the insurance plan, and wherein comparing the one or more of the identified insurance policy values to the one or more identifiers associated with each of the plurality of insurance plans includes:

identifying, by the one more processors, a first insurance policy value in the image of the insurance card corresponding to the bank identification number and a second insurance policy value in the image of the insurance card corresponding to the primary care network; and comparing, by the one or more processors, at least one of: the first insurance policy value or the second insurance policy value to the stored bank identification number or the stored primary care network for each of the plurality of insurance plans to identify a match between the first or second insurance policy value and one of the plurality of insurance plans.

4. The method of claim 1, further comprising:

identifying a label within one of the bounding boxes describing one of the plurality of insurance policy characteristics based on at least some of the text included in the bounding box; and identifying the insurance policy value associated with the identified label based on a remaining portion of the text included in the bounding box.

5. The method of claim 1, wherein the first and second bounding boxes are different bounding boxes.

6. The method of claim 1, further comprising:

in response to identifying the match between the one or more identified insurance policy values and the one or more identifiers associated with one of the plurality of insurance plans, identifying additional insurance policy values corresponding to additional insurance policy characteristics stored with the insurance plan, wherein the additional insurance policy values and the additional insurance policy characteristics are not included on the image of the insurance card.

7. The method of claim 1, further comprising:

for at least one of the plurality of insurance policy characteristics, storing a set of rules for converting the insurance policy value corresponding to the insurance policy characteristic to a valid insurance policy value; and converting the insurance policy value corresponding to the insurance policy characteristic using the stored set of rules.

8. A system for extracting information from an insurance card, the system comprising:

a communication network; and a server device communicatively coupled to the communication network, the server device including one or more processors, and a non-transitory computer-readable memory coupled to the one or more processors and storing instructions thereon that, when executed by the one or more processors, cause the server device to:

store for each of a plurality of customers, a standardized customer record including a customer identifier indicative of a customer;
store for each of a plurality of insurance plans, one or more identifiers associated with the insurance plan;
receive from a client device communicatively coupled to the communication network, the customer identifier for one of the plurality of customers and an image of an insurance card for the customer, wherein the insurance card is associated with an insurance plan and the image of the insurance card is captured by a camera in the client device;
convert information included on the image of the insurance card into a standardized format including a set of insurance policy characteristics associated with the insurance plan and corresponding insurance policy values including:
  analyze the image of the insurance card to identify an insurance policy value for each of a plurality of insurance policy characteristics associated with the insurance plan, including:
    generate bounding boxes around regions of the image of the insurance card that include text;
    identify a label within a first bounding box of the bounding boxes describing one of the plurality of insurance policy characteristics; and
    identify a second bounding box of the bounding boxes including the insurance policy value associated with the identified label by determining image coordinates for each bounding box, creating an array of image coordinate differentials comparing the location of each bounding box to the location of the first bounding box, filtering out at least one of the bounding boxes located to the left of the first bounding box according to the array of image coordinate differentials, and identifying, as the second bounding box, abounding box of the filtered bounding boxes which is closest to the first bounding box according to the array of image coordinate differentials;
  compare one or more of the identified insurance policy values to the one or more identifiers associated with each of the plurality of insurance plans;
  in response to identifying a match between the one or more identified insurance policy values and the one or more identifiers associated with one of the plurality of insurance plans, provide the standardized set of insurance policy characteristics and the corresponding insurance policy values to be stored in the standardized customer record of the customer;
  update the standardized customer record for the customer with the standardized set of insurance policy characteristics and the corresponding insurance policy values; and
  submit the standardized set of insurance policy characteristics and the corresponding insurance policy values to bill an insurance provider.

9. The system of claim 8, wherein the plurality of insurance policy characteristics include two or more of: a policyholder name, a policyholder identifier, a policyholder group number, a contract name, an insurance provider, an insurance plan name, an input code corresponding to the insurance plan name, an insurance plan effective date, a bank identification number, or a primary care network.

10. The system of claim 9, wherein the one or more identifiers associated with the insurance plan include a bank identification number or a primary care network associated with the insurance plan, and to compare the one or more of the identified insurance policy values to the one or more identifiers associated with each of the plurality of insurance plans, the instructions cause the server device to:
  identify a first insurance policy value in the image of the insurance card corresponding to the bank identification number and a second insurance policy value in the image of the insurance card corresponding to the primary care network; and
  compare at least one of: the first insurance policy value or the second insurance policy value to the stored bank identification number or the stored primary care network for each of the plurality of insurance plans to identify a match between the first or second insurance policy value and one of the plurality of insurance plans.

11. The system of claim 8, wherein the instructions further cause the server device to:
  identify a label within one of the bounding boxes describing one of the plurality of insurance policy characteristics based on at least some of the text included in the bounding box; and
  identify the insurance policy value associated with the identified label based on a remaining portion of the text included in the bounding box.

12. The system of claim 8, wherein the first and second bounding boxes are different bounding boxes.

13. The system of claim 8, wherein the instructions further cause the server device to:
  in response to identifying the match between the one or more identified insurance policy values and the one or more identifiers associated with one of the plurality of insurance plans, identify additional insurance policy values corresponding to additional insurance policy characteristics stored with the insurance plan, wherein the additional insurance policy values and the additional insurance policy characteristics are not included on the image of the insurance card.

14. The system of claim 8, wherein the instructions further cause the server device to:
  for at least one of the plurality of insurance policy characteristics, store a set of rules for converting the insurance policy value corresponding to the insurance policy characteristic to a valid insurance policy value; and
  convert the insurance policy value corresponding to the insurance policy characteristic using the stored set of rules.

* * * * *